(12) United States Patent
Meixner et al.

(10) Patent No.: US 10,685,422 B2
(45) Date of Patent: *Jun. 16, 2020

(54) COMPILER MANAGED MEMORY FOR IMAGE PROCESSOR

(71) Applicant: Google LLC, Mountain View, CA (US)

(72) Inventors: Albert Meixner, Mountain View, CA (US); Hyunchul Park, Santa Clara, CA (US); Qiuling Zhu, San Jose, CA (US); Jason Rupert Redgrave, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,819

(22) Filed: Feb. 11, 2019

(65) Prior Publication Data

US 2019/0188824 A1    Jun. 20, 2019

Related U.S. Application Data

(63) Continuation of application No. 15/427,374, filed on Feb. 8, 2017, now Pat. No. 10,204,396.

(Continued)

(51) Int. Cl.
*G09G 3/36* (2006.01)
*G06T 1/60* (2006.01)
(Continued)

(52) U.S. Cl.
CPC ............ *G06T 1/60* (2013.01); *G06F 9/30032* (2013.01); *G06F 9/30036* (2013.01);
(Continued)

(58) Field of Classification Search
CPC ....... G06T 1/20; G06T 3/4015; G06F 9/3885; G06F 15/8023; G06F 9/30032; G06F 9/30043; G09G 5/395
See application file for complete search history.

(56) References Cited

U.S. PATENT DOCUMENTS 4,445,177 A    4/1984    Bratt et al.
4,935,894 A    6/1990    Ternes et al.
(Continued)

FOREIGN PATENT DOCUMENTS

CN    1672419 A    9/2005
CN    1916959 A    2/2007
(Continued)

OTHER PUBLICATIONS

KR Office Action in Korean Appln. 10-2018-7022164, dated Apr. 29, 2019, 10 pages (with English translation).
(Continued)

*Primary Examiner* — Hau H Nguyen
(74) *Attorney, Agent, or Firm* — Fish & Richardson P.C.

(57) ABSTRACT

A method is described. The method includes repeatedly loading a next sheet of image data from a first location of a memory into a two dimensional shift register array. The memory is locally coupled to the two-dimensional shift register array and an execution lane array having a smaller dimension than the two-dimensional shift register array along at least one array axis. The loaded next sheet of image data keeps within an image area of the two-dimensional shift register array. The method also includes repeatedly determining output values for the next sheet of image data through execution of program code instructions along respective lanes of the execution lane array, wherein, a stencil size used in determining the output values encompasses only pixels that reside within the two-dimensional shift register array.

20 Claims, 29 Drawing Sheets

Related U.S. Application Data

(60) Provisional application No. 62/300,671, filed on Feb. 26, 2016.

(51) Int. Cl.
*G06F 9/38* (2018.01)
*G06T 1/20* (2006.01)
*G06F 9/30* (2018.01)

(52) U.S. Cl.
CPC ...... *G06F 9/30043* (2013.01); *G06F 9/30134* (2013.01); *G06F 9/30138* (2013.01); *G06F 9/3887* (2013.01); *G06T 1/20* (2013.01)

(56) References Cited

U.S. PATENT DOCUMENTS

| | | | |
|---|---|---|---|
| 5,253,308 | A | 10/1993 | Johnson |
| 5,612,693 | A | 3/1997 | Craft et al. |
| 5,751,864 | A | 5/1998 | Moriwake et al. |
| 5,892,962 | A | 4/1999 | Cloutier |
| 6,049,859 | A | 4/2000 | Gliese et al. |
| 6,366,289 | B1 | 4/2002 | Johns |
| 6,587,158 | B1 | 7/2003 | Dale et al. |
| 6,728,862 | B1 | 4/2004 | Wilson |
| 6,745,319 | B1 | 6/2004 | Balmer et al. |
| 6,948,050 | B1 | 9/2005 | Gove et al. |
| 6,970,196 | B1 | 11/2005 | Masatoshi et al. |
| 7,010,177 | B1 | 3/2006 | Mattison |
| 7,167,890 | B2 | 1/2007 | Lin et al. |
| 7,200,287 | B2 | 4/2007 | Fukuda et al. |
| 7,286,717 | B2 | 10/2007 | Nomizu |
| 7,583,851 | B2 | 9/2009 | Kudo et al. |
| 7,941,634 | B2 | 5/2011 | Georgi et al. |
| 8,156,284 | B2 | 4/2012 | Vorbach et al. |
| 8,321,849 | B2 | 11/2012 | Nickolls et al. |
| 8,436,857 | B2 | 5/2013 | Twilleager |
| 8,508,612 | B2 | 8/2013 | Cote et al. |
| 8,543,843 | B1 | 9/2013 | Chenq et al. |
| 8,650,384 | B2 | 2/2014 | Lee et al. |
| 8,749,667 | B2 | 6/2014 | Noraz et al. |
| 8,786,614 | B2 | 7/2014 | Curry et al. |
| 8,797,323 | B2 | 8/2014 | Salvi et al. |
| 8,823,736 | B2 | 9/2014 | Barringer et al. |
| 8,970,884 | B2 | 3/2015 | Tsuji et al. |
| 8,976,195 | B1 | 3/2015 | Lindholm et al. |
| 2005/0270412 | A1 | 12/2005 | Kaman et al. |
| 2006/0044576 | A1 | 3/2006 | Tabata et al. |
| 2007/0047828 | A1 | 3/2007 | Ishii et al. |
| 2007/0080969 | A1 | 4/2007 | Yamaura |
| 2007/0156729 | A1 | 7/2007 | Shaylor |
| 2008/0111823 | A1 | 5/2008 | Fan et al. |
| 2008/0133881 | A1 | 6/2008 | Georgi et al. |
| 2008/0244222 | A1 | 10/2008 | Supalov et al. |
| 2009/0002390 | A1 | 1/2009 | Kuna |
| 2009/0228677 | A1 | 9/2009 | Liege |
| 2009/0300621 | A1 | 12/2009 | Mantor et al. |
| 2009/0317009 | A1 | 12/2009 | Ren |
| 2010/0122105 | A1 | 5/2010 | Tughrul Arsian et al. |
| 2010/0188538 | A1 | 7/2010 | Suqawa et al. |
| 2011/0055495 | A1 | 3/2011 | Wolford et al. |
| 2011/0087867 | A1 | 4/2011 | Jacobson et al. |
| 2011/0125768 | A1 | 5/2011 | Shibao |
| 2011/0153925 | A1 | 6/2011 | Bains et al. |
| 2012/0320070 | A1 | 12/2012 | Arva |
| 2013/0027416 | A1 | 1/2013 | Vaithianathan et al. |
| 2013/0202051 | A1 | 8/2013 | Zhou |
| 2013/0243329 | A1 | 9/2013 | Oro Garcia et al. |
| 2013/0307859 | A1 | 11/2013 | Johnson |
| 2013/0314428 | A1 | 11/2013 | Chen et al. |
| 2013/0318544 | A1 | 11/2013 | Kuroda et al. |
| 2014/0028876 | A1 | 1/2014 | Mills |
| 2014/0136816 | A1 | 5/2014 | Krig |
| 2014/0282611 | A1 | 9/2014 | Campbell et al. |
| 2015/0086134 | A1 | 3/2015 | Hameed |
| 2015/0106596 | A1 | 4/2015 | Vorbach et al. |
| 2016/0219225 | A1 | 7/2016 | Zhu et al. |
| 2016/0313980 | A1 | 10/2016 | Meixner et al. |
| 2016/0313984 | A1 | 10/2016 | Meixner et al. |
| 2016/0313999 | A1 | 10/2016 | Meixner et al. |
| 2016/0314555 | A1 | 10/2016 | Zhu et al. |
| 2016/0316094 | A1 | 10/2016 | Meixner et al. |
| 2016/0316107 | A1 | 10/2016 | Shacham et al. |
| 2016/0316157 | A1 | 10/2016 | Desai et al. |
| 2017/0287103 | A1 | 10/2017 | Meixner et al. |

FOREIGN PATENT DOCUMENTS

| | | |
|---|---|---|
| CN | 101371233 B | 10/2012 |
| CN | 103019656 A | 4/2013 |
| CN | 105247478 A | 1/2016 |
| EP | 0293701 | 12/1988 |
| JP | 2008-165756 | 7/2008 |
| JP | 2013090070 | 5/2013 |
| TW | 201133390 | 10/2011 |
| TW | 201528131 A | 7/2015 |
| WO | WO 9409595 | 4/1994 |
| WO | WO 2007/071883 | 6/2007 |
| WO | WO 2016/171926 | 10/2016 |
| WO | WO 2016/171928 | 10/2016 |

OTHER PUBLICATIONS

"ChimeraTM: The NVIDIA Computational Photography Architecture" Whitepaper, NVIDIA Corporation 2013, 15 pages.

"Multioutput Scaler Reference Design" Altera Corporation, Application Note AN-648-1.0, Aug. 2012, 18 pages.

Adams, et al. "The Frankencamera: An Experimental Platform for Computational Photography", ACM Transactions on Graphics, vol. 29, No. 4, Article 29, Publication Jul. 2010, 12 pages.

Ahn, et al., "Evaluating the Image Stream Architecture." In ACM SIGARCH Computer Architecture News, vol. 32, No. 2, IEEE Computer Society, Jun. 2004, 14 pages.

Arasan "Silicon Hive Announces New Image Signal Processor", Eindhoven, the Netherlands, May 16, 2006, http://www.design-reuse.com/news/13362/silicon-hive-image-signal-processor.html, 3 pages.

Balfour, et al., "An Energy-Efficient Processor Architecture for Embedded Systems" IEEE Computer Architecture Letters 7, No. 1 p. 29-32, May 2008.

Barry, et al., "Always-On Vision Processing Unit for Mobile Applications", IEEE Micro, Mar./Apr. 2015, pp. 56-66.

Bolotoff, Paul V., "Alpha-The History in Facts and Comments" http://alasir.com/articles/alpha_history/alpha_21164_21164pc.html, Last modification date Apr. 22, 2007, 5 pages.

Brunhaver, John S. "Design and Optimization of a Stencil Engine", Stanford University, Jun. 2015, 133 pages.

Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.

Cardells-Tormo et al., "Area-efficient 2-D Shift-variant Convolvers for FPGA-based Digital Image Processing," IEEE Workshop on Signal Processing Systems Design and Implementation, Nov. 2, 2005, 5 pages.

CEVA-MM3101: An Imaging-Optimized DSP Core Swings for an Embedded Vision Home Run, http://www.bdti.com/InsideDSP/2012/01/24/CEVA, Jan. 19, 2012, 3 pages.

Chao et al., "Pyramid Architecture for 3840×2160 Quad Full High Definition 30 Frames/s Video Acquisition," IEEE Transactions on Circuits and Systems for Video Technology, Nov. 1, 2010, 10 pages.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

Chen, et al., "DaDianNao: A Machine-Learning Supercomputer." 47m Annual IEEE/ACM International Symposium, pp. 609-622, IEEE, Dec. 2014.

(56) References Cited

OTHER PUBLICATIONS

Chenyun, et al., "A Paradigm Shift in Local Interconnect Technology Design in the Era of Nanoscale Multigate and Gate-All-Around Devices," IEEE Electron Device Letters, vol. 36, No. 3, pp. 274-226, Mar. 2015.
Clearspeed Whitepaper: CSX Processor Architecture, www.clearspeed.com, 2007, 16 pages.
Codrescu, et al., "Hexagon DSP: An Architecture Optimized for Mobile Multimedia and Communications." IEEE Micro vol. 34, Issue 2, pp. 34-43, Mar. 2014.
Dally, William J., "Computer architecture is all about interconnect." Proceedings of 8th International Symposium High-Perf. Comp. Architecture, Feb. 2002, 11 pages.
De Dinechin, et al., "A Clustered Manycore Processor Architecture for Embedded and Accelerated Applications." In High Performance Extreme Computing Conference (HPEC), IEEE, pp. 1-6, Sep. 2013.
DeVito, et al., "Terra: A Multi-Stage Language for High-Performance Computing", PLD1'13, Jun. 16-22, 2013, Seattle, Washington, 11 pages.
DeVito, et al.,"First-class Runtime Generation of High-Performance Types using Exotypes", PLD1'14, Jun. 9-11, 2014 ACM, 12 pages.
Dykes et al., "Communication and Computation Patterns of Large Scale Image Convolutions on Parallel Architectures," Parallel Processing Symposium, Jan. 1, 1994, 6 pages.
Eichenberger, et al., "Optimizing Compiler for the Cell Processor" PACT, Tuesday, Sep. 20, 2005, Part 1, pp. 1-16.
Eichenberger, et al., "Optimizing Compiler for the Cell Processor" PACT, Tuesday, Sep. 20, 2005, Part 2, pp. 17-32.
EyeQ2TM, "Vision System on a Chip", Mobileye, Sep. 2007, 4 pages.
Farabet, et al., "Hardware Accelerated Convolutional Neural Networks for Synthetic Vision Systems." Proceedings of 2010 IEEE International Symposium, pp. 257-260, Jun. 2010.
Farabet, et al., "Neuflow: A Runtime Reconfigurable Dataflow Processor for Vision." IEEE Computer Society Conference, pp. 109-116, Jun. 2011.
Galal, et al., "FPU Generator for Design Space Exploration." 21st IEEE Symposium on Computer Arithmetic (ARITH), Apr. 2013, 10 pages.
Gentile, et al., "Image Processing Chain for Digital Still Cameras Based on SIMPil Architecture." ICCP International Conference Workshops, pp. 215-222, IEEE, Jun. 2005.
Goldstein, et al., "PipeRench: A Coprocessor for Streaming Multimedia Acceleration", Carnegie Mellow University, Research Showcase @CMU, Appears in the 26th Annual International Symposium on Computer Architecture, May 1999, Atlanta, Georgia, 14 pages.
Gupta, et al., "A VLSI Architecture for Updating Raster-Scan Displays", Computer Graphics, vol. 15, No. 3, Aug. 1981, pp. 71-78.
Hameed, et al., "Understanding Sources of Inefficiency in General-Purpose Chips." ACM SIGARCH Computer Architecture News, vol. 38, No. 3, pp. 37-47, 2010.
Hanrahan, Pat, "Domain-Specific Languages for Heterogeneous GPU Computing", NVIDIA Technology Conference, Oct. 2, 2009, 30 pages.
Hegarty, et al., "Darkroom: Compiling High-Level Image Processing Code into Hardware Pipelines", Proceedings of ACM SIGGRAPH, Jul. 2014, 11 pages.
Henretty, et al., "A Stencil Compiler for Short-Vector SIMD Architectures", ACM, ICS'13, Jun. 10-14, 2013, Eugene, Oregon, pp. 13-24.
Holewinski, Justin et al. "High-Performance Code Generation for Stencil Computations on 3PU Architectures", Proceeding ICS '12 Proceedings of the 26th ACM International Conference on Supercomputing, Jun. 25, 2012, pp. 311-320.
Horowitz, Mark, "Computing's Energy Problem: (and what we can do about it)", IEEE, International Solid-State Circuits Conference 2014, 46 pages.
Kapasi, et al. "The Imagine Stream Processor", IEEE, International Conference on Computer Design: VLSI in Computers and Processors (ICCD'02), 2002, 17 pages.
Khailany, et al., "A Programmable 512 GOPS Stream Processor for Signal, Image, and Video Processing", IEEE Journal of Solid-State Circuits, vol. 43, No. 1, pp. 202-213, Jan. 2008.
Khawam, et al., "The Reconfigurable Instruction Cell Array", IEEE Transactions on Very Large Scale Integration (VLSI) Systems, vol. 16, No. 1, Jan. 2008, pp. 75-85.
Khronos, SPIR 2.0 "Provisional Specification to Enable Compiler Innovation on Diverse Parallel Architectures", Aug. 11, 2014, 2 pages.
Levinthal, "Parallel Computers for Graphics Applications", ACM, 1987, pp. 193-198.
Levinthal, et al., "Chap-A SIMD Graphics Processor", Computer Graphics, vol. 18, No. 3, Jul. 1984, pp. 77-82.
Li, et al., "High Performance Code Generation for Stencil Computation on Heterogeneous Multi-Device", 2013 IEEE International Conference on High Performance Computing and Communications & 2013 IEEE International Conference on Embedded and Ubiquitous Computing, Nov. 13, 2013.pp. 1512-1518.
M.J. Duff, "CLIP 4: A Large Scale Integrated Circuit Array Parallel Processor," Proc. IEEE lnt'I Joint Conf. Pattern Recognition, . . . Jan. 2004, pp. 728-733.
Mandal, et al., "An Embedded Vision Engine (EVE) for Automotive Vision Processing." In Circuits and Systems (ISCAS), 2014 IEEE Symposium, pp. 49-52, IEEE, 2014.
Mcintosh-Smith, "A Next-Generation Many-Core Processor With Reliability, Fault Tolerance and Adaptive Power Management Features Optimized for Embedded and High Performance Computing Applications" in Proceedings of the High Performance Embedded Computing Conference (HPEC) 2008, pp. 1-2, 5.
Mody, et al., "High Performance and Flexible Imaging Sub-System." In Advances in Computing, Communications and Informatics (ICACCI), 2014 International Conference, pp. 545-548. IEEE, 2014.
Molnar, et al., "PixelFlow: High-Speed Rendering Using Image Composition" proceedings of Siggraph 92, Computer Graphics, 26, Jul. 2, 1992, 10 pages.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
MPPA—MANYCORE, Product Family Overview http://www.kalray.eu/IMG/pdf/FLYER_MPPA_MANYCORE-4.pdf, Feb. 2014, 2 pages.
Nightingale, Edmund B., et al., "Helios: Heterogeneous Multiprocessing with Satellite Kernels," SOSP '09, Oct. 11-14, 2009, Big Sky, Montana, U.S.A., (Oct. 11, 2009), 14 pages.
Notification of Transmittal of the International Search Report and the written Opinion of the International Searching Authority, in related PCT/US2017/018444 dated May 29, 2017, 6 pages.
NVIDIA—NVIDIA's Next Generation CUDA™ Compute Architecture: Kepler™, GK110/210, 2014, 23 pages, http://international.download.nvidia.com/pdf/kepler/NVIDIA-Kepler-GK110-GK210-Architecture-Whitepaper.pdf.
NVIDIA Tegra K1—A New Era in Mobile Computing—Whitepapers—Jan. 2014, 26 pages.
NVIDIA Tegra X1—NVIDIA'S New Mobile Superchip—Whitepapers—Jan. 2015, 41 pages.
NVIDIA, "PTX:Parallel Thread Execution ISA Version 1.4", Aug. 23, 2010, 135 pages.
Olofsson, et al., "A 25 GFLOPS/Watt Software Programmable Floating Point Accelerator" High Performance Embedded Computing Conference, 2010, 2 pages.
Oosterhout, Optimized Pixel Template Image Correlator, Master Thesis, Aug. 19, 1992, 74 pages.
Parker, Richard, "Embedding Computer Vision in Electronic Devices: How New Hardware and Software Choices Have Changed the Designer's Approach", Future Technology Magazine, pp. 22-23, Feb. 2013.

(56) References Cited

OTHER PUBLICATIONS

Pelc, Oscar, "Multimedia Support in the i.MX31 and i.MX31 L Applications Processors", Freescale Semiconductor, Inc., Feb. 2006, http://cache.freescale.com/files/32bit/doc/white_paper/IMX31MUTIWO.pdf, 12 pages.

Pham, et al., "NeuFlow: Dataflow Vision Processing System-On-A-Chip." IEEE 55m International Midwest Symposium, Aug. 2012, 4 pages.

Qadeer, et al., "Convolution Engine: Balancing Efficiency & Flexibility in Specialized Computing", ISCA '13 Tel-Aviv, Israel, ACM 2013, pp. 24-35.

Ragan-Kelley et al., "Halide: A Language and Compiler for Optimizing Parallelism, Locality, and Recomputation in Image Processing Pipelines," Jun. 16, 2013, 12 pages.

S.F. Reddaway, "DAP—A Distributed Processor Array", Dec. 1973, ISCA '73 Proceedings of the First Ann. Symposium on Computer Architecture, pp. 61-65.

SCP2200: Image Cognition Processors Family [Product Brief]*, https://www.element14.com/community/docs/DOC-50990, Oct. 26, 2012, 2 pages.

SCP2200: Image Cognition Processors*, https://www.element14.com/community/docs/DOC-50984/I/scp2200-image-cognition-processors, Oct. 25, 2012, 2 pages.

Sedaghati, et al., "SIVEC: A Vector Instruction Extension for High Performance Stencil Computation," Parallel Architectures and Compilation Techniques, Oct. 10, 2011, 12 pages.

SemiWiki.com—New CEVA-ZM4 Vision IP Does Point clouds and and More: Published Feb. 27, 2015, https://www.semiwiki.com/forum/content/4354-new-ceva-xm4-vision-ip-does-point-clouds-more.html.

Shacham, et al. "Smart Memories Polymorphic Chip Multiprocessor", Proceedings of the 46th Design Automation Conference (OAC), San Francisco, CA, Jul. 2009.

Shacham, et al., "Rethinking Digital Design: Why Design Must Change", IEEE micro Magazine, Nov./Dec. 2010.

Shacham, Ofer, "Chip Multiprocessor Generator: Automatic Generation of Custom and Heterogeneous Complete Platforms" Dissertation—Stanford University, May 2011, 190 pages. PART 1.

Shacham, Ofer, "Chip Multiprocessor Generator: Automatic Generation of Custom and Heterogeneous Complete Platforms" Dissertation—Stanford University, May 2011, 190 pages. PART 2.

Silicon Hive: "Silicon System Design of Media and Communications Applications", Jun. 13, 2007, 22 pages.

Spampinato, et al., "A Basic Linear Algebra Compiler", ACM, CG0'14, Feb. 15-19, 2014, Orlando FL, pp. 23-32.

SPIR, The SPIR Specification, Version 2.0, Revision Date Jun. 5, 2014, 40 pages.

Stein, et al., "A Computer Vision System on a Chip: A Case Study From the Automotive Domain." IEEE Computer Society Conference, p. 130, 2005.

Stojanov, et al., "Abstracting Vector Architectures in Library Generators: Case Study Convolution Filters", ARRAY 14, ACM, Jun. 11, 2014, UK, pp. 14-19.

Stream Processors, Inc. Announces Storm-1 Family of Data-Parallel Digital Signal Processors, ISSCC 2007, Feb. 12, 2007, 3 pages. http://www/businesswire.com/news/home/20070212005230/en/Stream-Processors-Announces-Storm-1-Family-Data-Parallel-Digital.

Stream Processors, Inc., Company History-Foundational Work in Stream Processing initiated in 1995, http://en.wikipedia.org/wiki/Stream_Processors,_inc., 5 pages.

Tanabe, et al., "Visconti: multi-VLIW image Recognition Processor Based on Configurable Processor [obstacle detection applications]", Custom Integrated Circuits Conference, IEEE, 2003, http://ieeexplore.ieee.org/document/1249387/?arnumber=1249387&tag=1.

Van der Wal, et al., "The Acadia Vision Processor", IEEE proceedings of International Workshop on Computer Applications for Machine Perception, Sep. 2000, http:citeseerx.ist.psu.edu/wiewdoc/download?doi=10.1.1.32.3830&rep=rep1&type=pdf, 10 pages.

Wahib et al., "Scalable Kernel Fusion for Memory-Bound GPU Applications," SC14: International Conference for High Performance Computing, Networking, Storage and Analysis, Nov. 16, 2014, 12 pages.

Written Opinion of the International Searching Authority, in related PCT/US2017/018444, dated May 29, 2017, 9 pages.

Yu et al., "Optimizing Data Intensive Window-based Image Processing on reconfigurable Hardware Boards," Proc. IEEE Workshop on Signal Processing System Design and Implementation, Nov. 2, 2005, 6 pages.

Zhou, Minhua, et al., "Parallel Tools in HEVC for High-Throughput Processing," Applications of Digital Processing, XXXV, Proc. of SPI, vol. 8499, (Jan. 1, 2012), pp. 1-13.

GB Search and Examination Report issued in British Application No. GB1820155.8, dated Feb. 15, 2019, 4 pages.

GB Office Action in British Appln. No. 1912713.3, dated Nov. 27, 2019, 4 pages.

CN Office Action in Chinese Appln. No. 201710107518.9, dated Dec. 3, 2019, 27 pages (with English translation).

JP Office Action in Japanese Appln. No. 2018-539834, dated Nov. 12, 2019, 26 pages (with Machine translation).

TW Office Action in Taiwanese Appln. No. 10821110770, dated Nov. 22, 2019, 14 pages (with Machine translation).

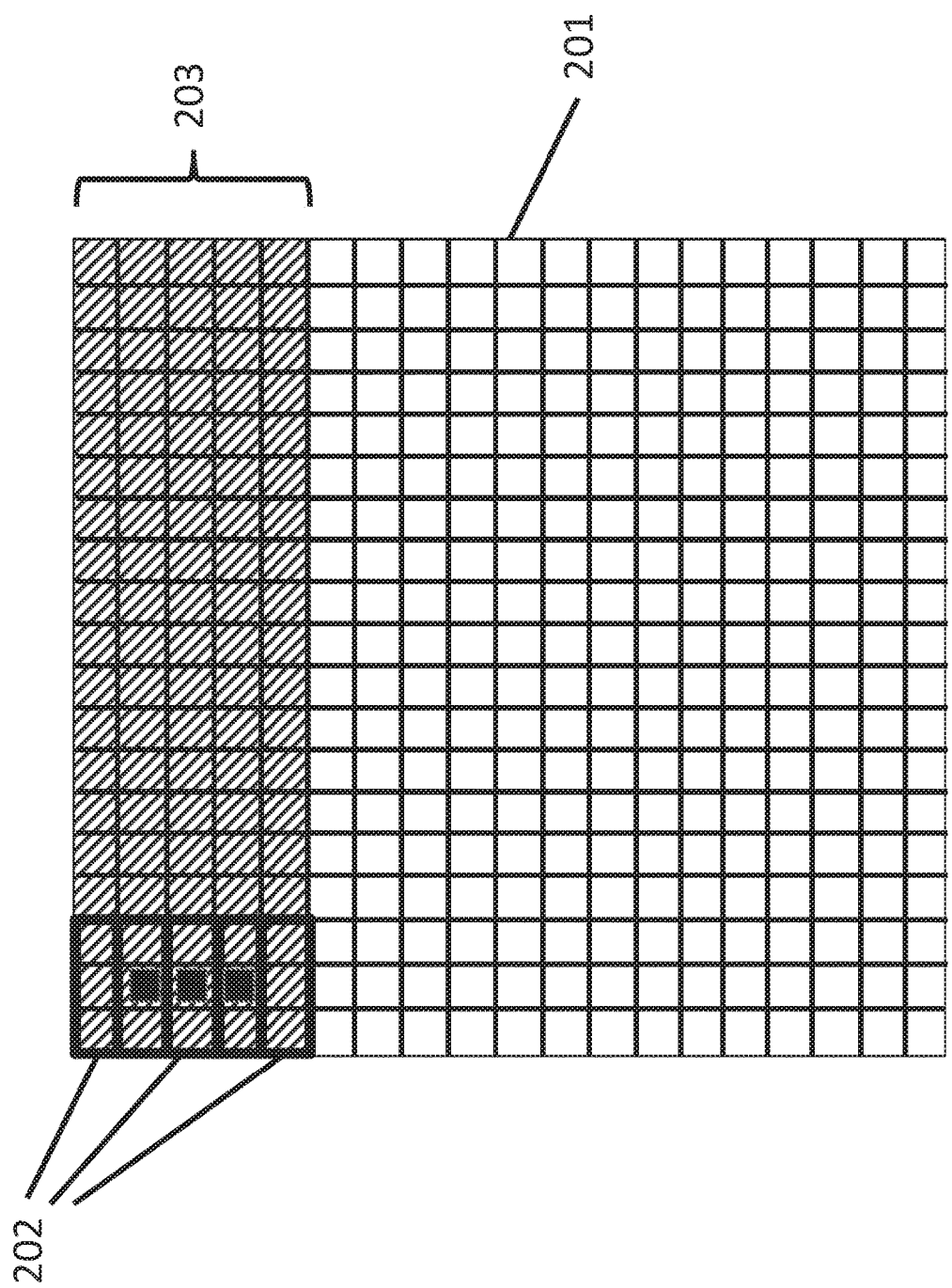

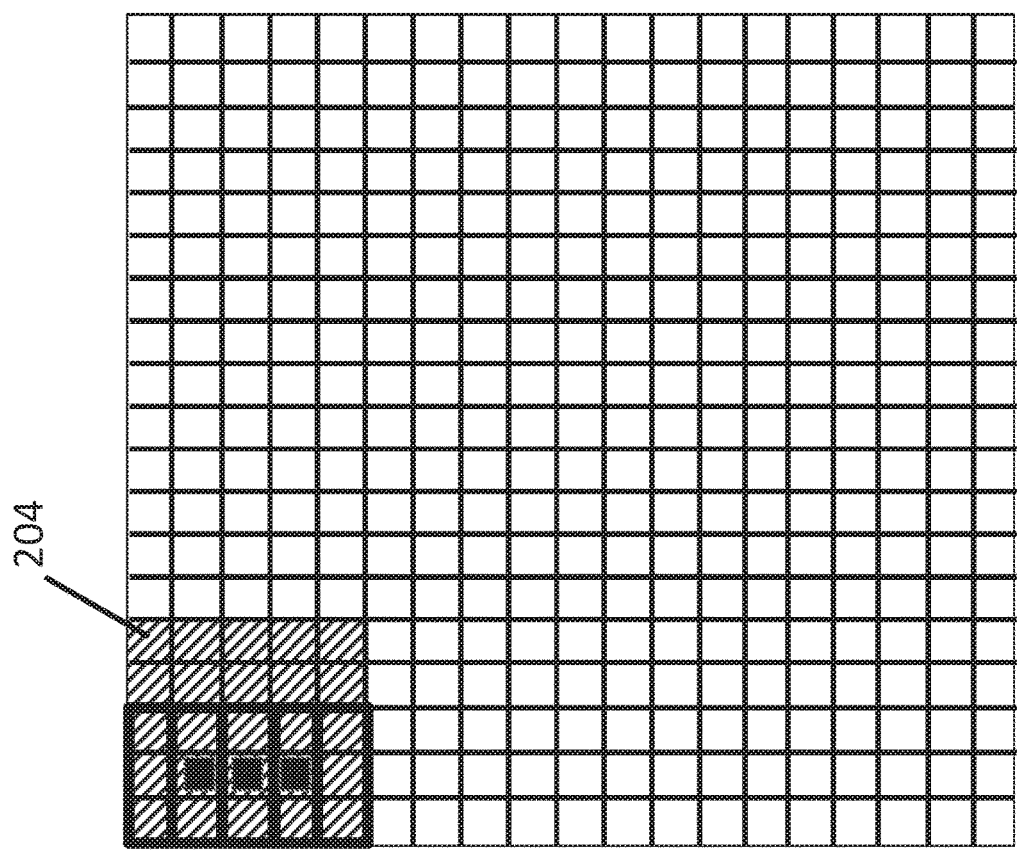

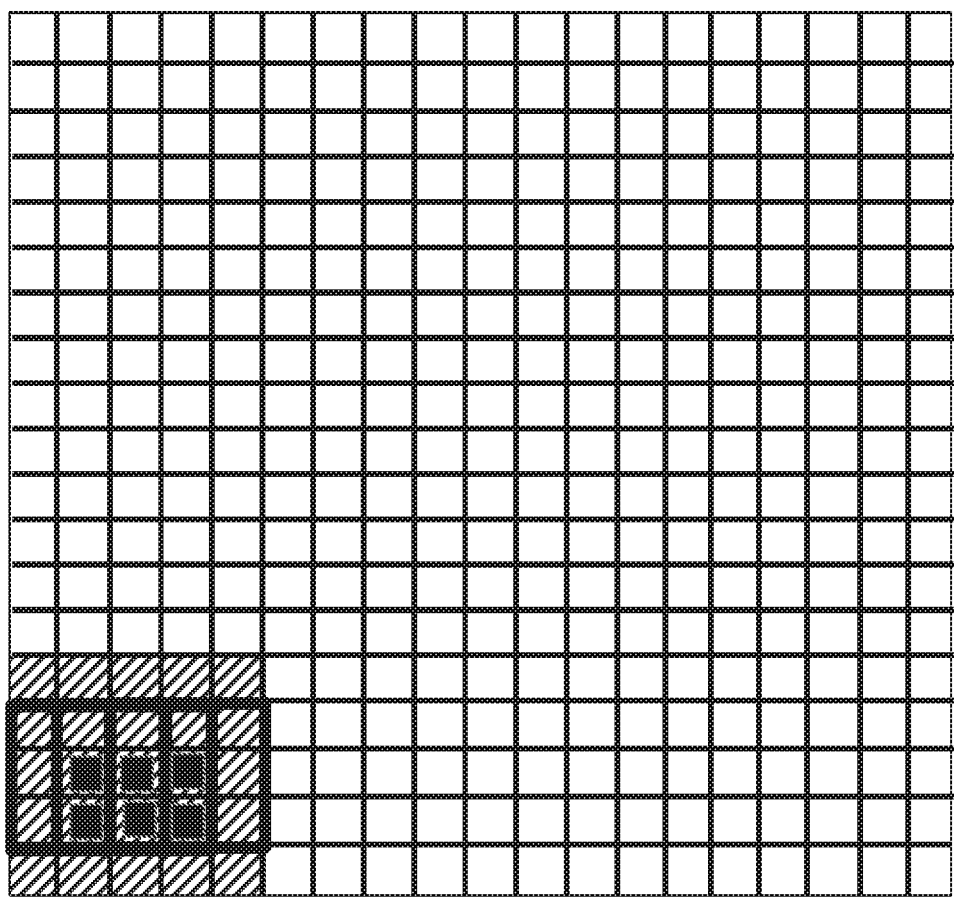

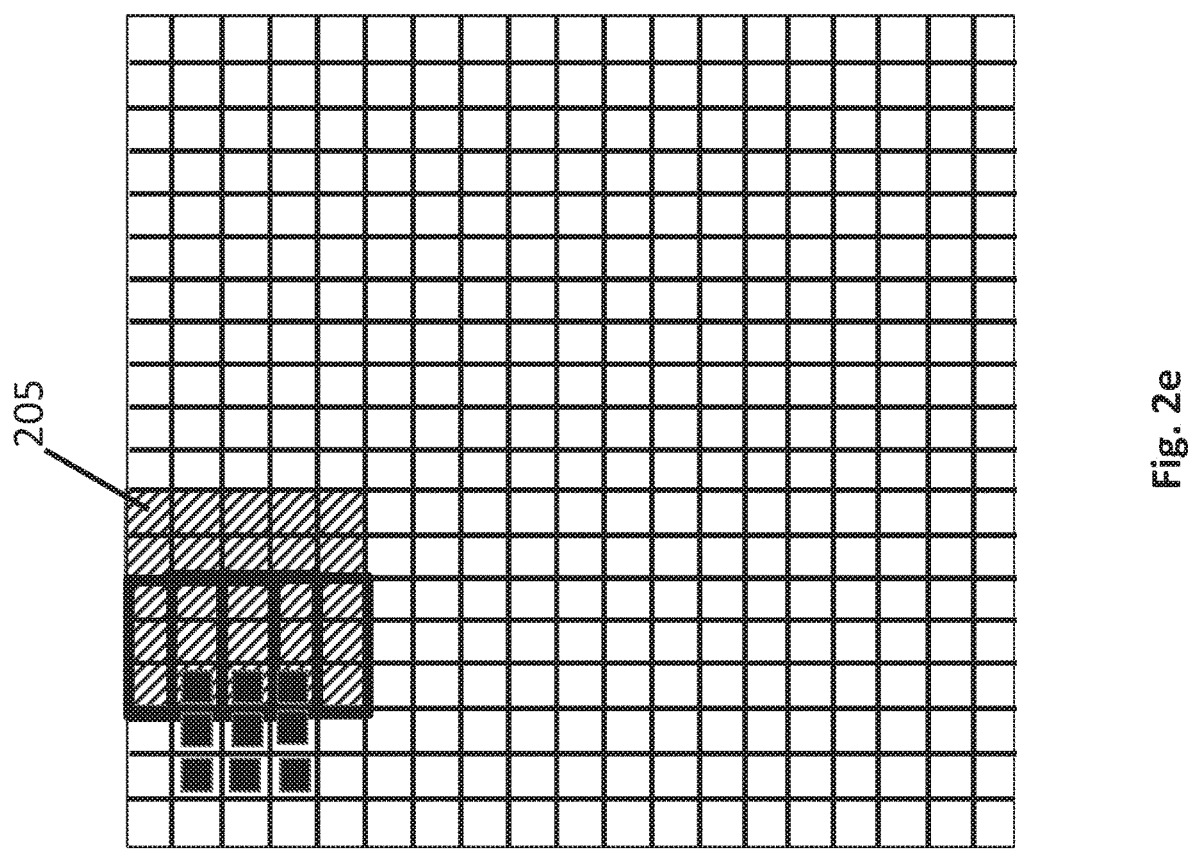

```
// thread X1: process stencil 1//
...
shift right 1
R1<= ADD R1, R2 // ADD G // thread X2: process stencil 2//
...
shift right 1
R1<= ADD R1, R2 // ADD L
```

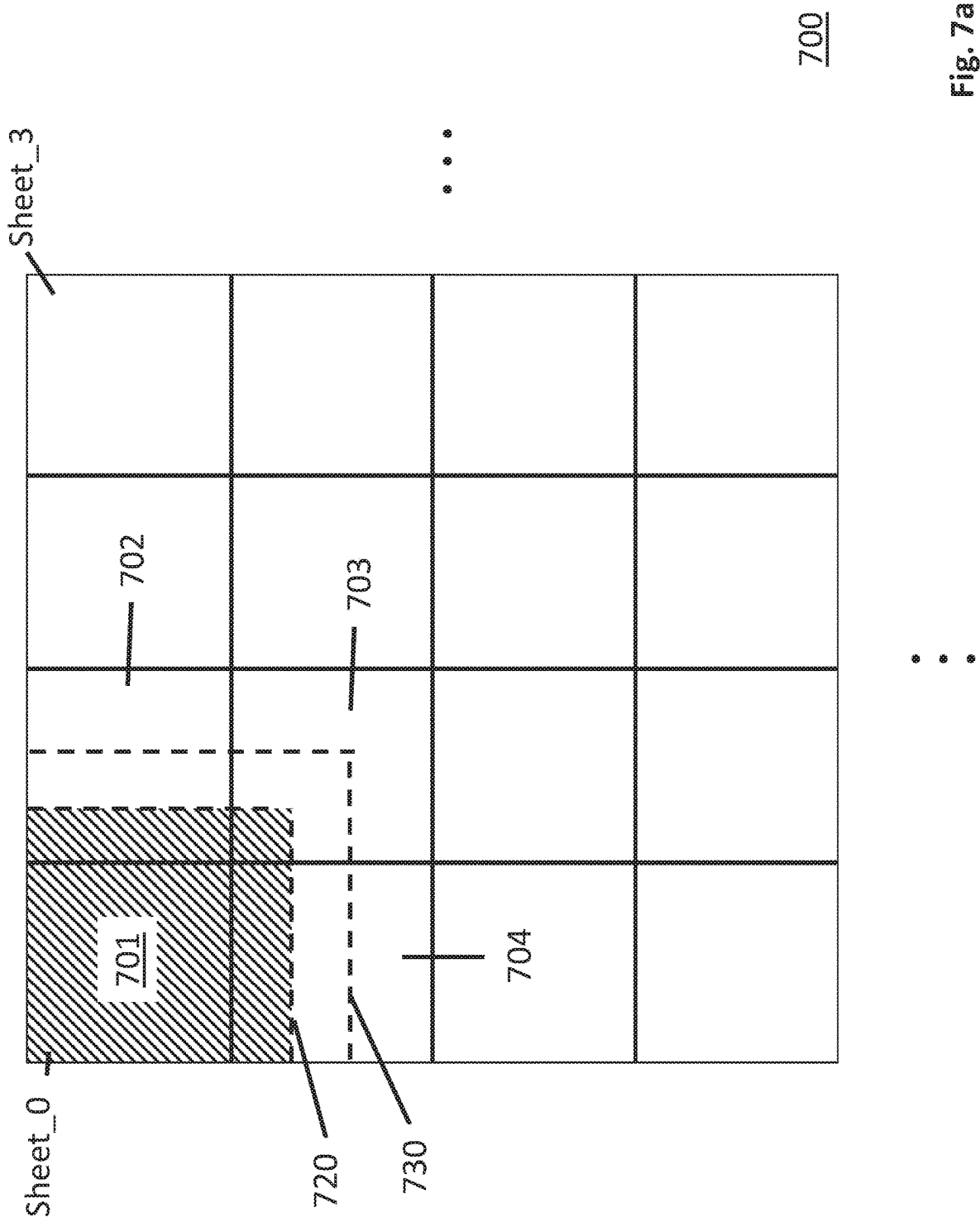

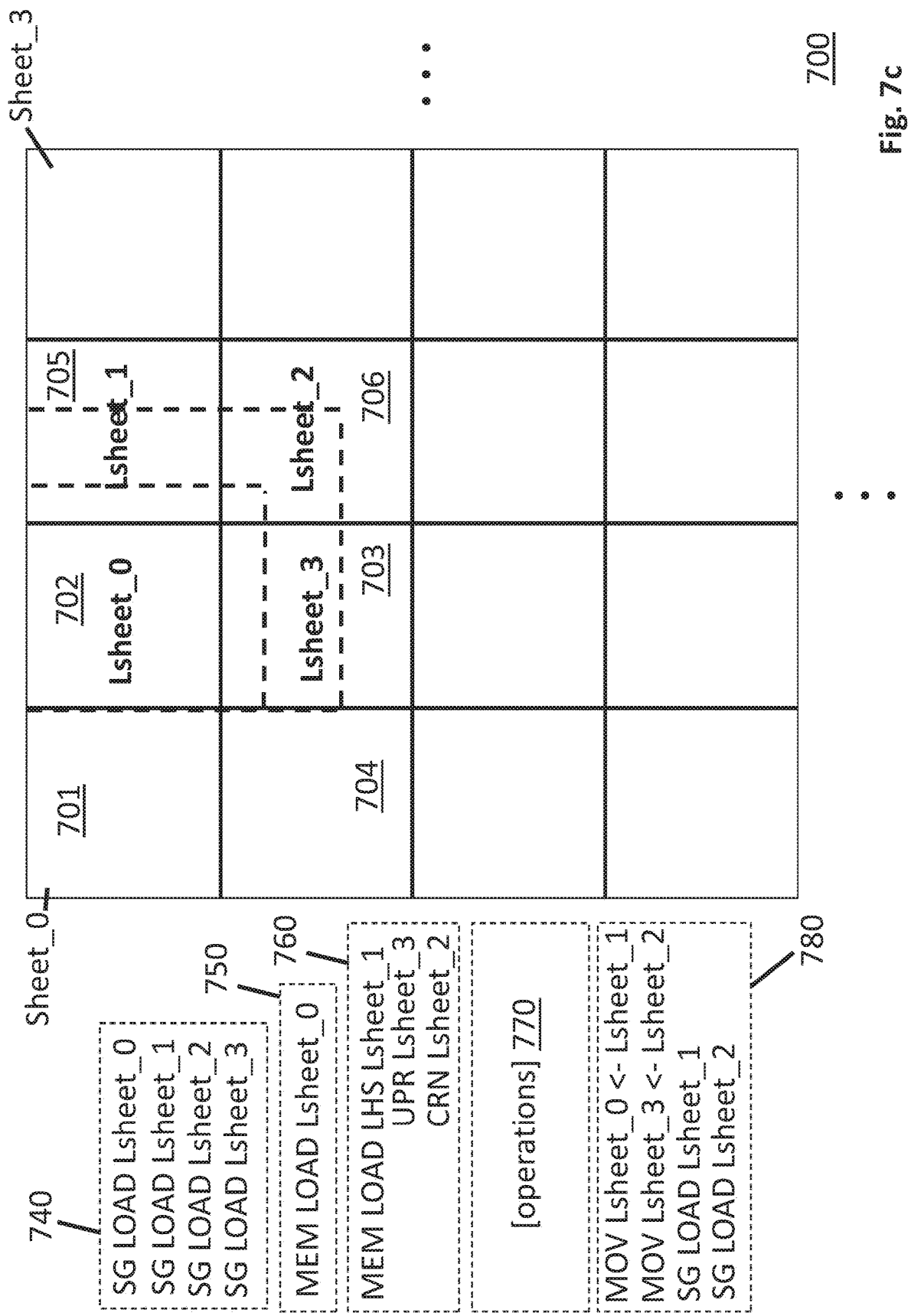

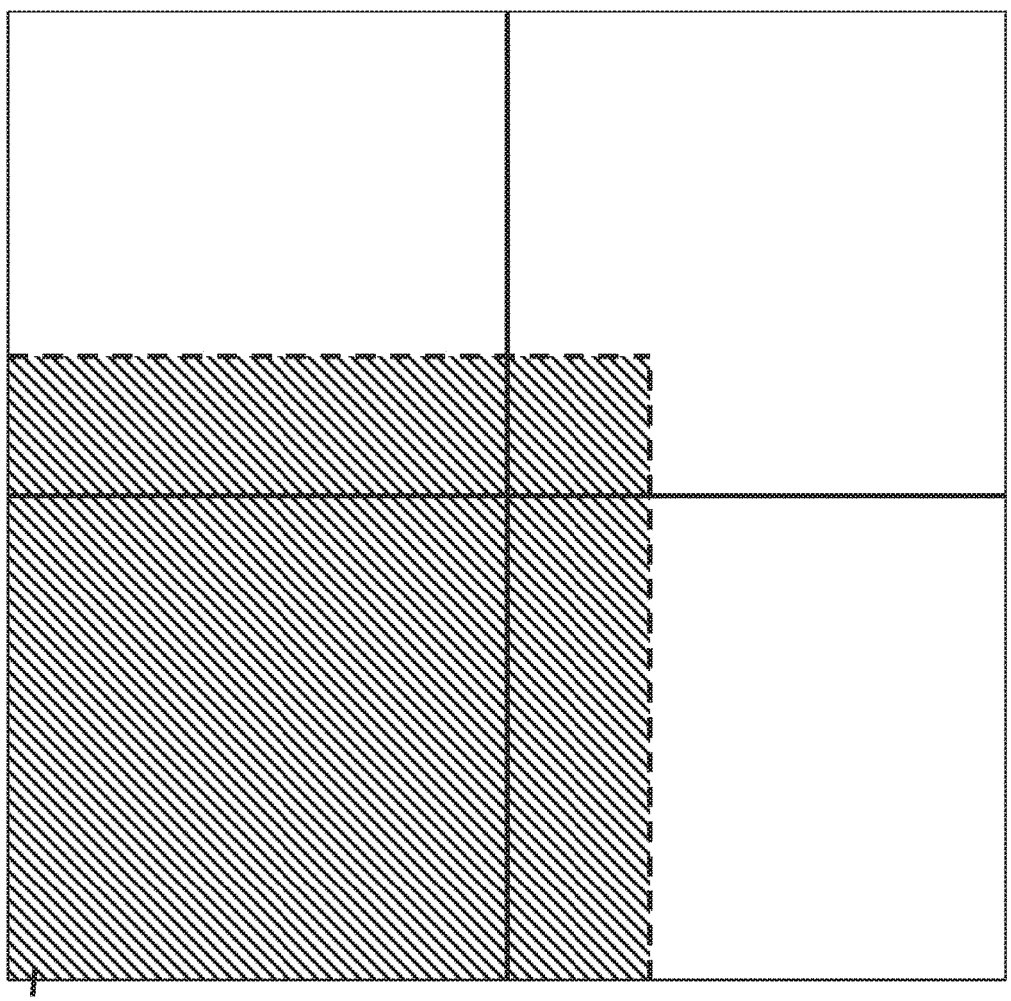

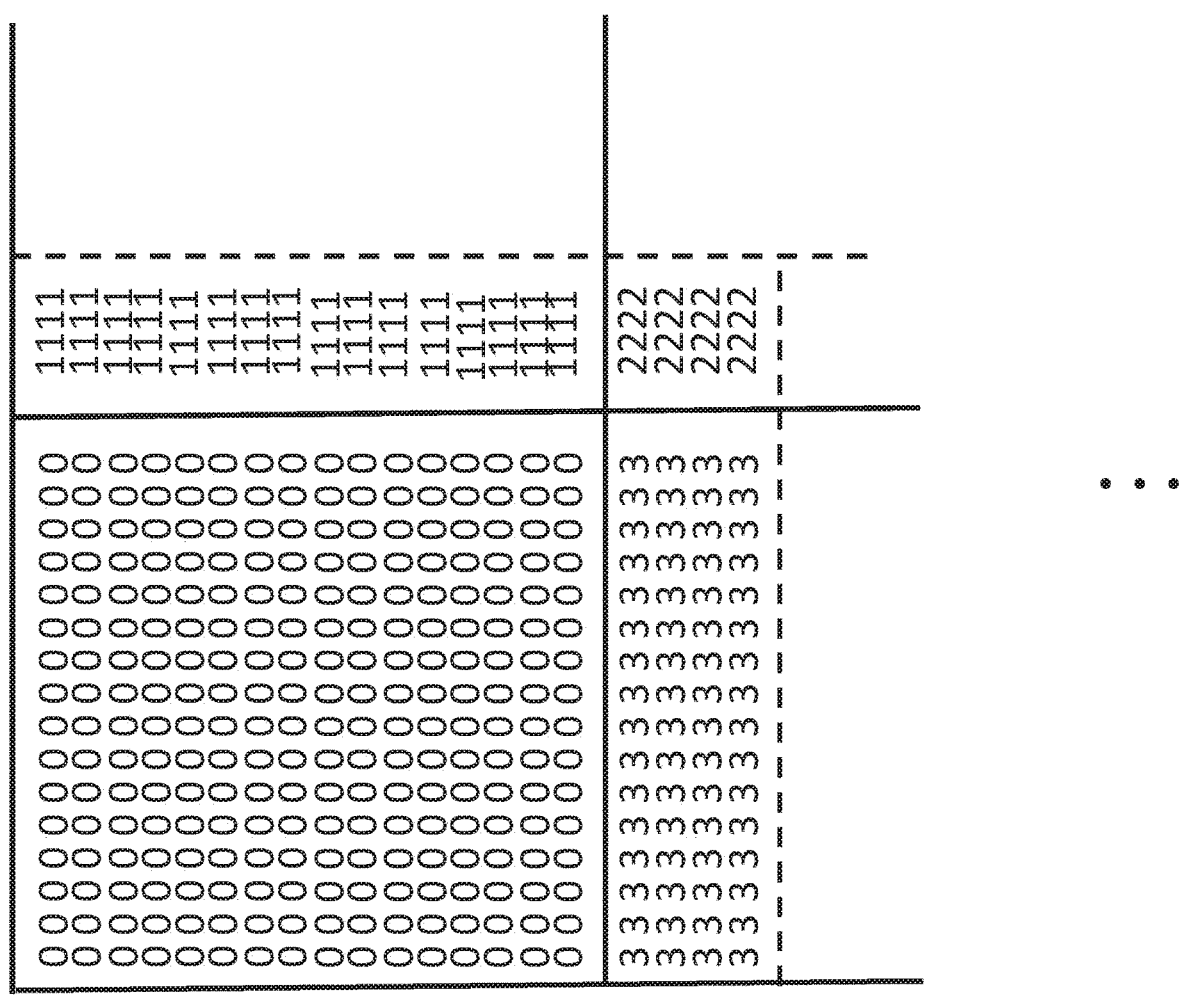

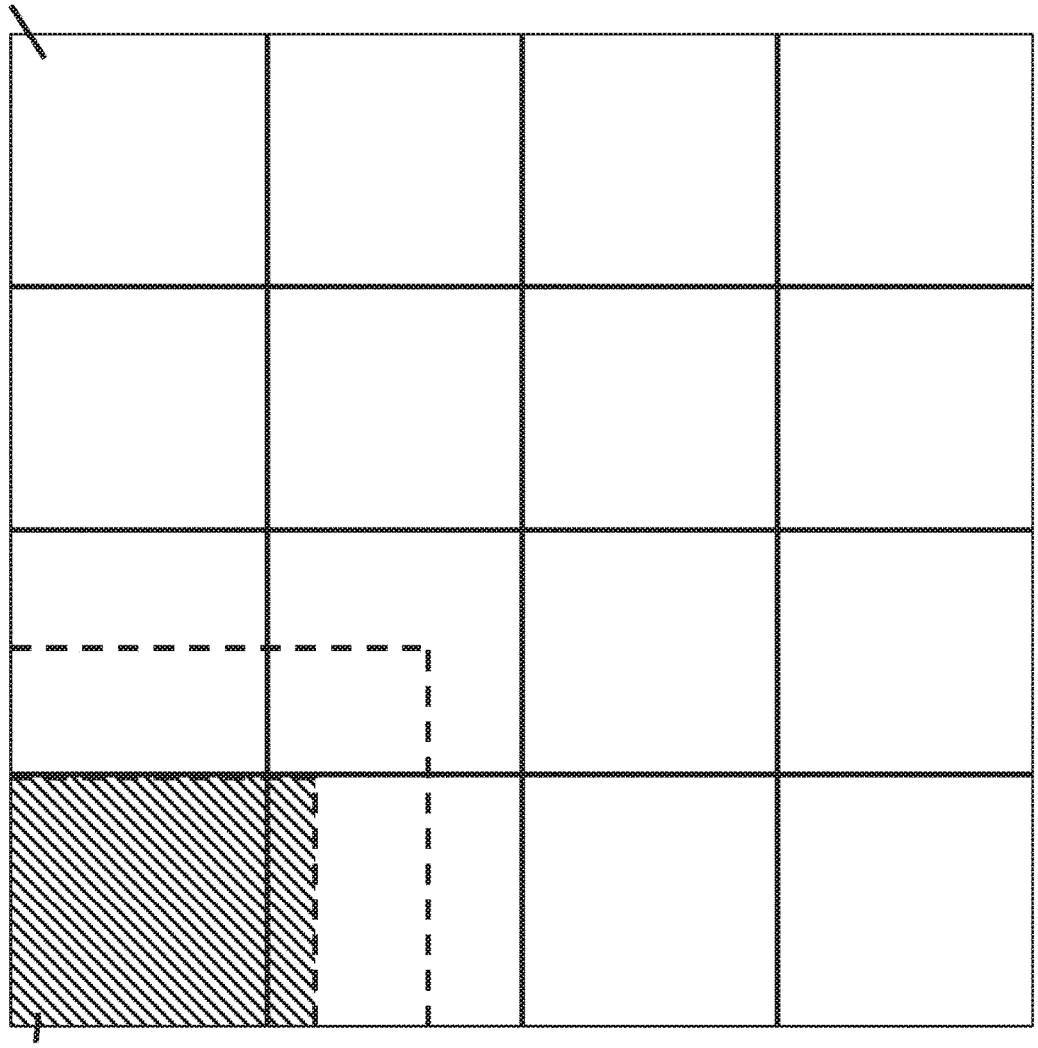

COMPILER MANAGED MEMORY FOR IMAGE PROCESSOR

CROSS-REFERENCE TO RELATED APPLICATIONS

This application is a continuation application of, and claims priority to U.S. application Ser. No. 15/427,374, now U.S. Pat. No. 10,204,396, filed on Feb. 8, 2017, which claims priority to U.S. Provisional Application No. 62/300,671, filed on Feb. 26, 2016. The entirety of the disclosures of the prior applications are herein incorporated by reference.

FIELD OF INVENTION

The field of invention pertains generally to image processing, and, more specifically, to a compiler managed memory for an image processor.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hard-wired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described. The method includes repeatedly loading a next sheet of image data from a first location of a memory into a two dimensional shift register array. The memory is locally coupled to the two-dimensional shift register array and an execution lane array having a smaller dimension than the two-dimensional shift register array along at least one array axis. The loaded next sheet of image data keeps within an image area of the two-dimensional shift register array. The method also includes repeatedly determining output values for the next sheet of image data through execution of program code instructions along respective lanes of the execution lane array, wherein, a stencil size used in determining the output values encompasses only pixels that reside within the two-dimensional shift register array. The method also includes repeatedly moving a next sheet of image data to be fully loaded into the two dimensional shift register array from a second location of the memory to the first location of the memory.

LIST OF FIGURES

The following description and accompanying drawings are used to illustrate embodiments of the invention. In the drawings:

FIGS. 2a, 2b, 2c, 2d and 2e depict the parsing of image data into a line group, the parsing of a line group into a sheet and the operation performed on a sheet with overlapping stencils;

Figure 7B:
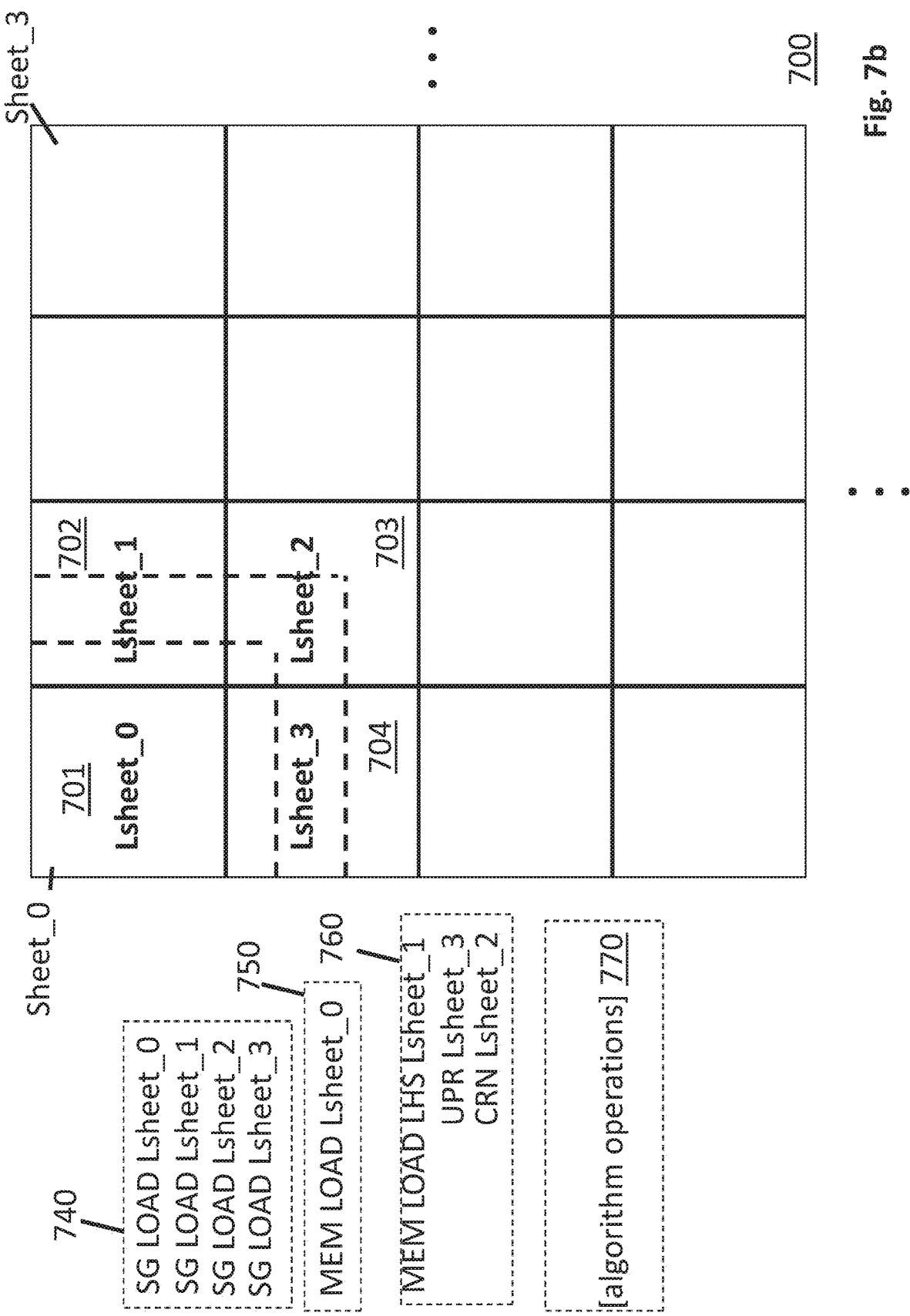
Figure 8:
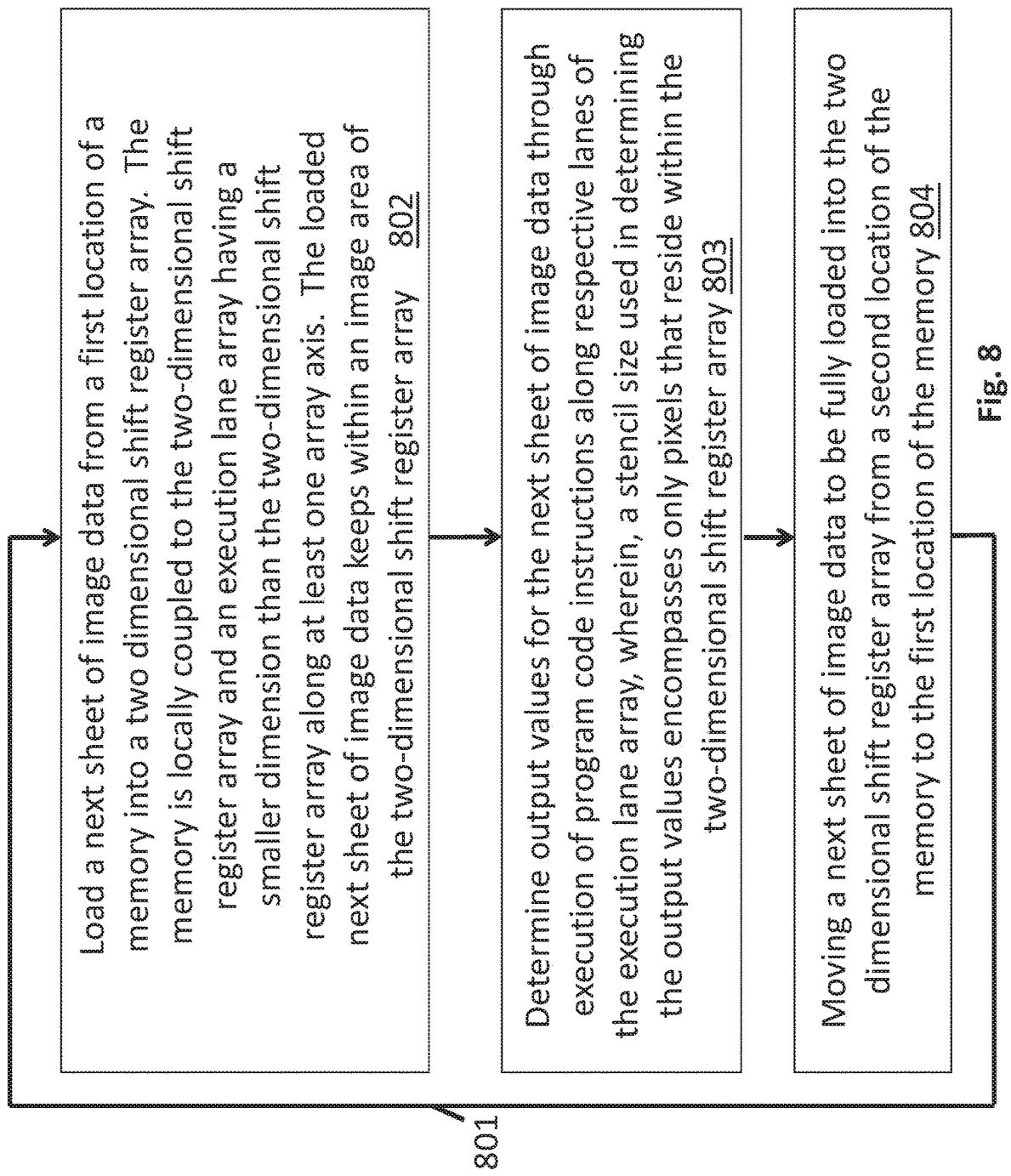
Figure 11:
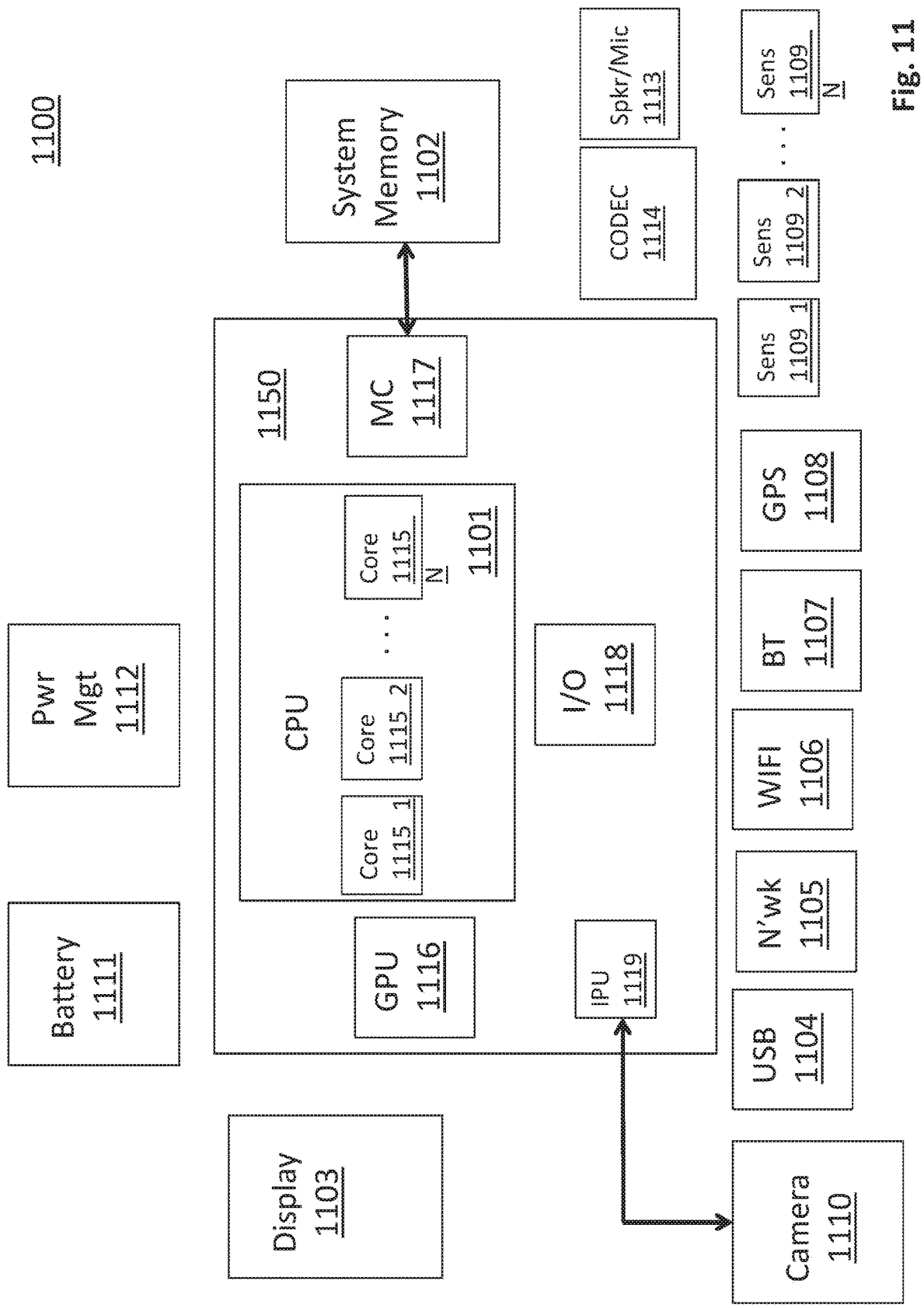

FIGS. 7a-7c pertains to a compiler managed memory access approach for an image processor data computation unit;

FIG. 8 shows a memory access methodology for an image processor;

FIGS. 9a and 9b pertains to an instruction used to generate a memory address;

FIG. 10 pertains to another compiler managed memory access approach;

FIG. 11 shows an embodiment of a computing system.

DETAILED DESCRIPTION a. Image Processor Hardware Architecture and Operation

Figure 1:
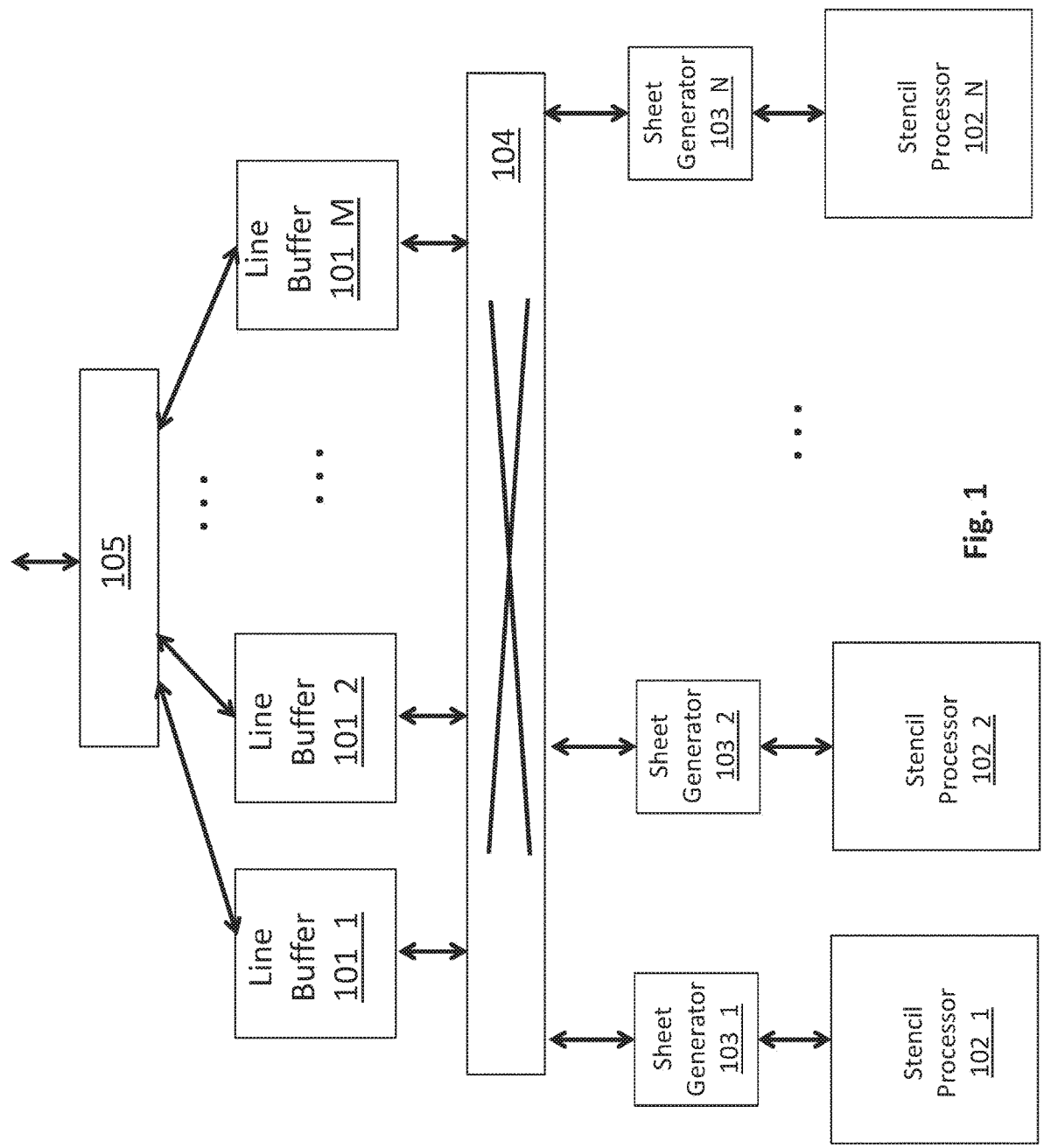
FIG. 1 shows an embodiment of an image processor hardware architecture.

FIG. 1 shows an embodiment of an architecture 100 for an image processor implemented in hardware. The image processor may be targeted, for example, by a compiler that converts program code written for a virtual processor within a simulated environment into program code that is actually executed by the hardware processor. As observed in FIG. 1, the architecture 100 includes a plurality of line buffer units 101_1 through 101_M interconnected to a plurality of stencil processor units 102_1 through 102_N and corresponding sheet generator units 103_1 through 103_N through a network 104 (e.g., a network on chip (NOC) including an on chip switch network, an on chip ring network or other kind of network). In an embodiment, any line buffer unit may connect to any sheet generator and corresponding stencil processor through the network 104.

In an embodiment, program code is compiled and loaded onto a corresponding stencil processor 102 to perform the image processing operations earlier defined by a software developer (program code may also be loaded onto the stencil processor's associated sheet generator 103, e.g., depending on design and implementation). In at least some instances an image processing pipeline may be realized by loading a first kernel program for a first pipeline stage into a first stencil processor 102_1, loading a second kernel program for a second pipeline stage into a second stencil processor 102_2, etc., where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 102_1, 102_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 105 and passed to one or more of the line buffer units 101 on a frame by frame basis. A particular line buffer unit parses its frame of image data into a smaller region of image data, referred to as a "a line group", and then passes the line group through the network 104 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 101_1 which parses the image data into line groups and directs the line groups to the sheet generator 103_1 whose corresponding stencil processor 102_1 is executing the code of the first kernel in the pipeline/DAG. Upon completion of operations by the stencil processor 102_1 on the line groups it processes, the sheet generator 103_1 sends output line groups to a "downstream" line buffer unit 101_2 (in some use cases the output line group may be sent back to the same line buffer unit 101_1 that earlier had sent the input line groups).

One or more "consumer" kernels that represent the next stage/operation in the pipeline/DAG executing on their own respective other sheet generator and stencil processor (e.g., sheet generator 103_2 and stencil processor 102_2) then receive from the downstream line buffer unit 101_2 the image data generated by the first stencil processor 102_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 102 is designed to simultaneously operate on multiple overlapping stencils of image data. The multiple overlapping stencils and internal hardware processing capacity of the stencil processor effectively determines the size of a sheet. Here, within a stencil processor 102, arrays of execution lanes operate in unison to simultaneously process the image data surface area covered by the multiple overlapping stencils.

As will be described in more detail below, in various embodiments sheets of image data are loaded into a two-dimensional register array structure within the stencil processor 102. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 2a through 2e illustrate at a high level embodiments of both the parsing activity of a line buffer unit 101, the finer grained parsing activity of a sheet generator unit 103 as well as the stencil processing activity of the stencil processor 102 that is coupled to the sheet generator unit 103.

FIG. 2a depicts an embodiment of an input frame of image data 201. FIG. 2a also depicts an outline of three overlapping stencils 202 (each having a dimension of 3 pixels×3 pixels) that a stencil processor is designed to operate over. The output pixel that each stencil respectively generates output image data for is highlighted in solid black. For simplicity, the three overlapping stencils 202 are depicted as overlapping only in the vertical direction. It is pertinent to recognize that in actuality a stencil processor may be designed to have overlapping stencils in both the vertical and horizontal directions.

Because of the vertical overlapping stencils 202 within the stencil processor, as observed in FIG. 2a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 101 is responsible for parsing a line group of input image data from an incoming frame that is sufficient for the stencil processors to operate over for an extended number of upcoming cycles. An exemplary depiction of a line group is illustrated as a shaded region 203. In an embodiment, the line buffer unit 101 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 203 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 2D:
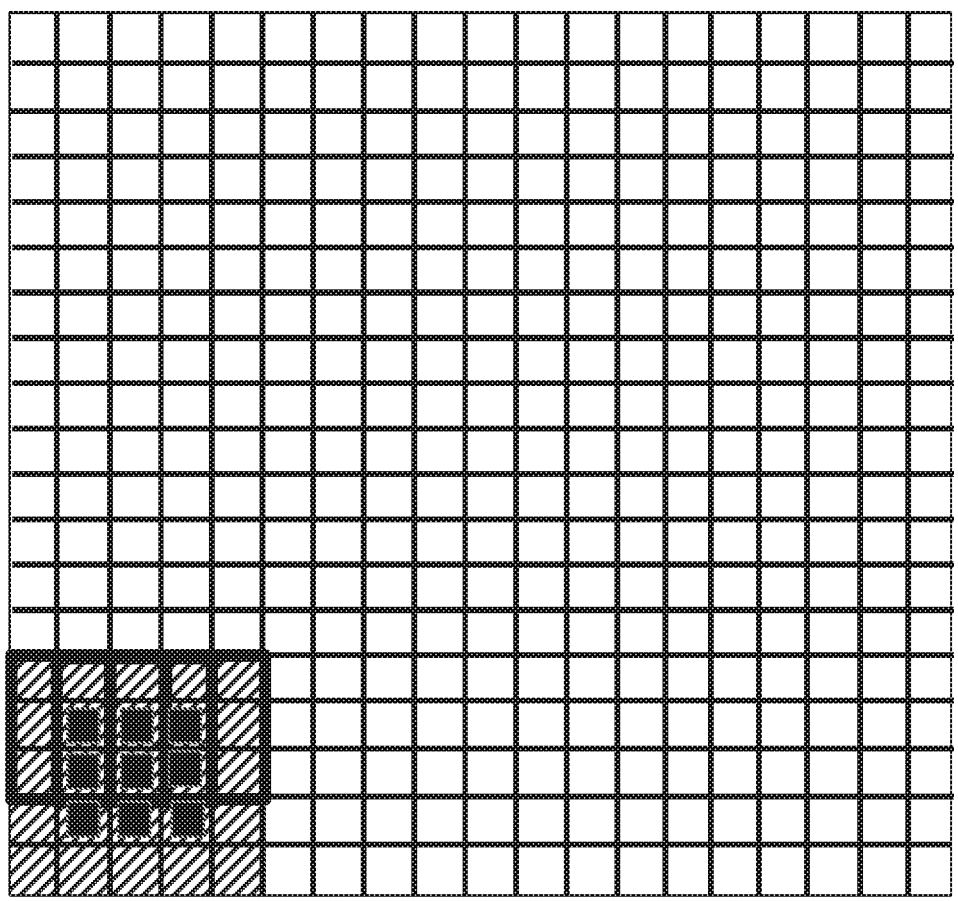

Thus, as observed in FIG. 2b, the sheet generator parses an initial sheet 204 from the line group 203 and provides it to the stencil processor (here, the sheet of data corresponds to the shaded region that is generally identified by reference number 204). As observed in FIGS. 2c and 2d, the stencil processor operates on the sheet of input image data by effectively moving the overlapping stencils 202 in a left to right fashion over the sheet. As of FIG. 2d, the number of pixels for which an output value could be calculated from the data within the sheet is exhausted (no other pixel positions can have an output value determined from the information within the sheet). For simplicity the border regions of the image have been ignored.

As observed in FIG. 2e the sheet generator then provides a next sheet 205 for the stencil processor to continue operations on. Note that the initial positions of the stencils as they begin operation on the next sheet is the next progression to the right from the point of exhaustion on the first sheet (as depicted previously in FIG. 2d). With the new sheet 205, the stencils will simply continue moving to the right as the stencil processor operates on the new sheet in the same manner as with the processing of the first sheet.

Note that there is some overlap between the data of the first sheet 204 and the data of the second sheet 205 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 3A:
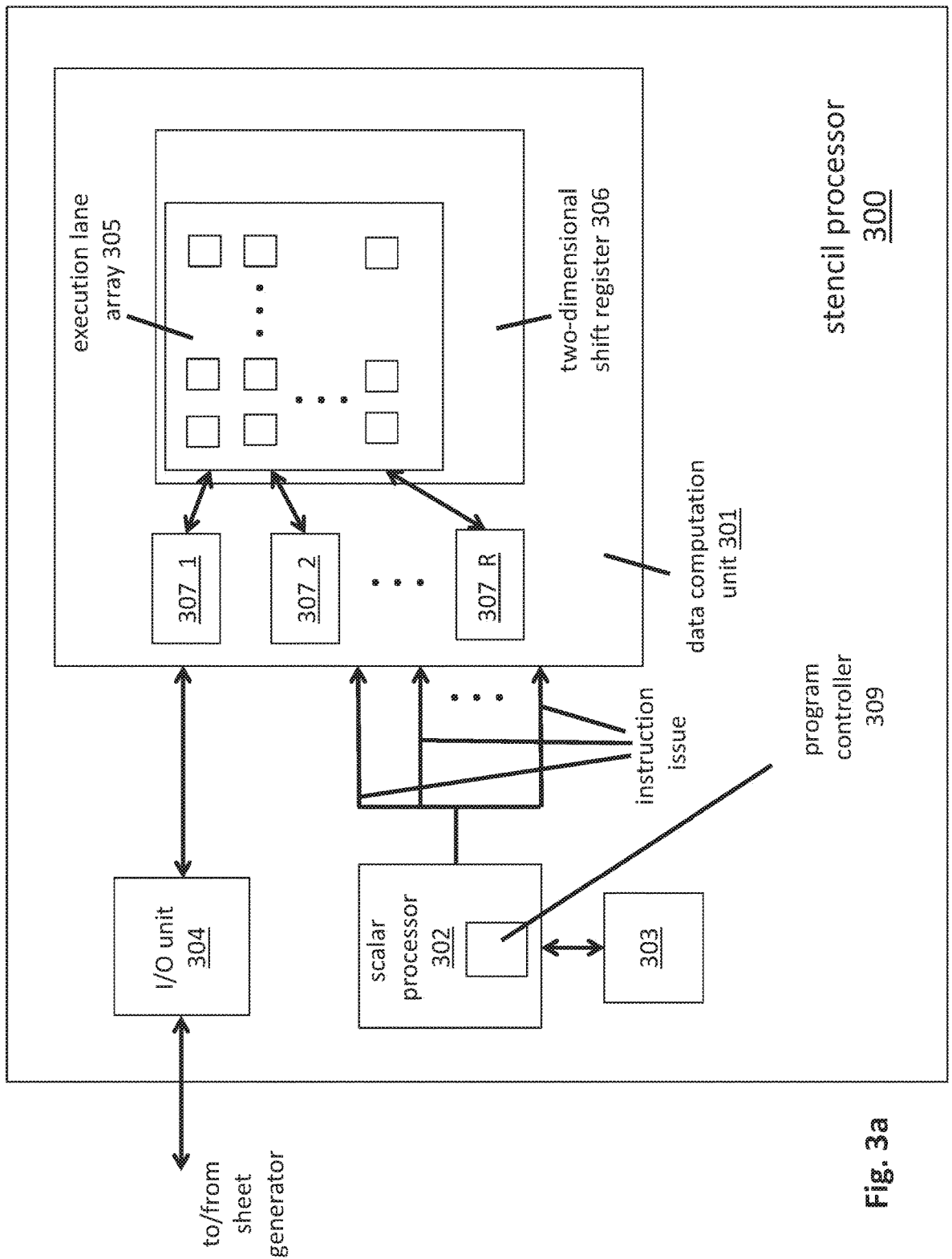
FIG. 3a shows an embodiment of a stencil processor.

FIG. 3a shows an embodiment of a stencil processor architecture 300. As observed in FIG. 3a, the stencil processor includes a data computation unit 301, a scalar processor 302 and associated memory 303 and an I/O unit 304. The data computation unit 301 includes an array of execution lanes 305, a two-dimensional shift array structure 306 and separate random access memories 307 associated with specific rows or columns of the array.

The I/O unit 304 is responsible for loading "input" sheets of data received from the sheet generator into the data computation unit 301 and storing "output" sheets of data from the stencil processor into the sheet generator. In an embodiment the loading of sheet data into the data computation unit 301 entails parsing a received sheet into rows/columns of image data and loading the rows/columns of image data into the two dimensional shift register structure 306 or respective random access memories 307 of the rows/columns of the execution lane array (described in more detail below). If the sheet is initially loaded into memories 307, the individual execution lanes within the execution lane array 305 may then load sheet data into the two-dimensional shift register structure 306 from the random access memories 307 when appropriate (e.g., as a load instruction just prior to operation on the sheet's data). Upon completion of the loading of a sheet of data into the register structure 306 (whether directly from a sheet generator or from memories 307), the execution lanes of the execution lane array 305 operate on the data and eventually "write back" finished data as a sheet directly back to the sheet generator, or, into the random access memories 307. If the later the I/O unit 304 fetches the data from the random access memories 307 to form an output sheet which is then forwarded to the sheet generator.

The scalar processor 302 includes a program controller 309 that reads the instructions of the stencil processor's program code from scalar memory 303 and issues the instructions to the execution lanes in the execution lane array 305. In an embodiment, a single same instruction is broadcast to all execution lanes within the array 305 to effect a SIMD-like behavior from the data computation unit 301. In an embodiment, the instruction format of the instructions read from scalar memory 303 and issued to the execution lanes of the execution lane array 305 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 305).

The combination of an execution lane array 305, program controller 309 and two dimensional shift register structure 306 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 305, the random access memories 307 may also keep one or more look-up tables. In various embodiments one or more scalar look-up tables may also be instantiated within the scalar memory 303.

A scalar look-up involves passing the same data value from the same look-up table from the same index to each of the execution lanes within the execution lane array 305. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 305 during the same clock cycle. Additional details concerning use and operation of look-up tables is provided further below.

Figure 3B:
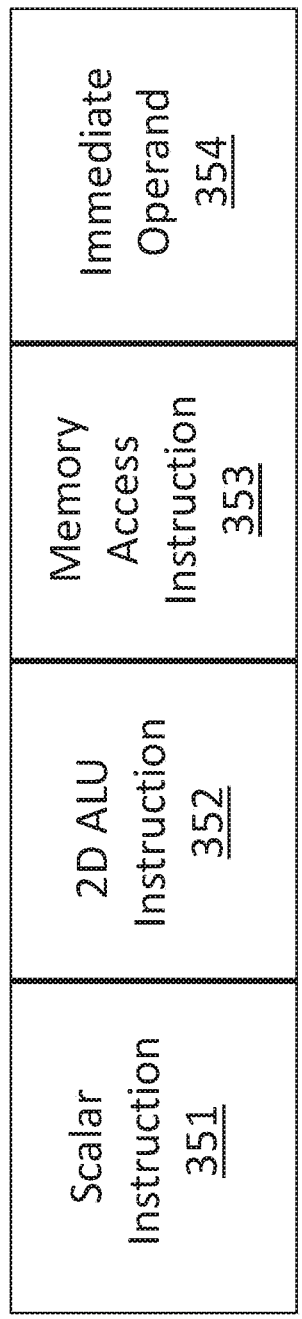
FIG. 3b shows an embodiment of an instruction word of the stencil processor.

FIG. 3b summarizes the VLIW instruction word embodiments(s) discussed above. As observed in FIG. 3b, the VLIW instruction word format includes fields for three separate instructions: 1) a scalar instruction 351 that is executed by the scalar processor; 2) an ALU instruction 352 that is broadcasted and executed in SIMD fashion by the respective ALUs within the execution lane array; and, 3) a memory instruction 353 that is broadcasted and executed in a partial SIMD fashion (e.g., if execution lanes along a same row in the execution lane array share a same random access memory, then one execution lane from each of the different rows actually execute the instruction (the format of the memory instruction 353 may include an operand that identifies which execution lane from each row executes the instruction).

A field 354 for one or more immediate operands is also included. Which of the instructions 351, 352, 353 use which immediate operand information may be identified in the instruction format. Each of instructions 351, 352, 353 also include their own respective input operand and resultant information (e.g., local registers for ALU operations and a local register and a memory address for memory access instructions). In an embodiment, the scalar instruction 351 is executed by the scalar processor before the execution lanes within the execution lane array execute either of the other two instructions 352, 353. That is, the execution of the VLIW word includes a first cycle upon which the scalar instruction 351 is executed followed by a second cycle upon with the other instructions 352, 353 may be executed (note that in various embodiments instructions 352 and 353 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 351 corresponds to or otherwise causes a command to be issued to the sheet generator also includes no-operation (NOOP) instructions in the other two instruction field 352, 353. The program code then enters a loop of NOOP instructions for instruction fields 352, 353 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 4:
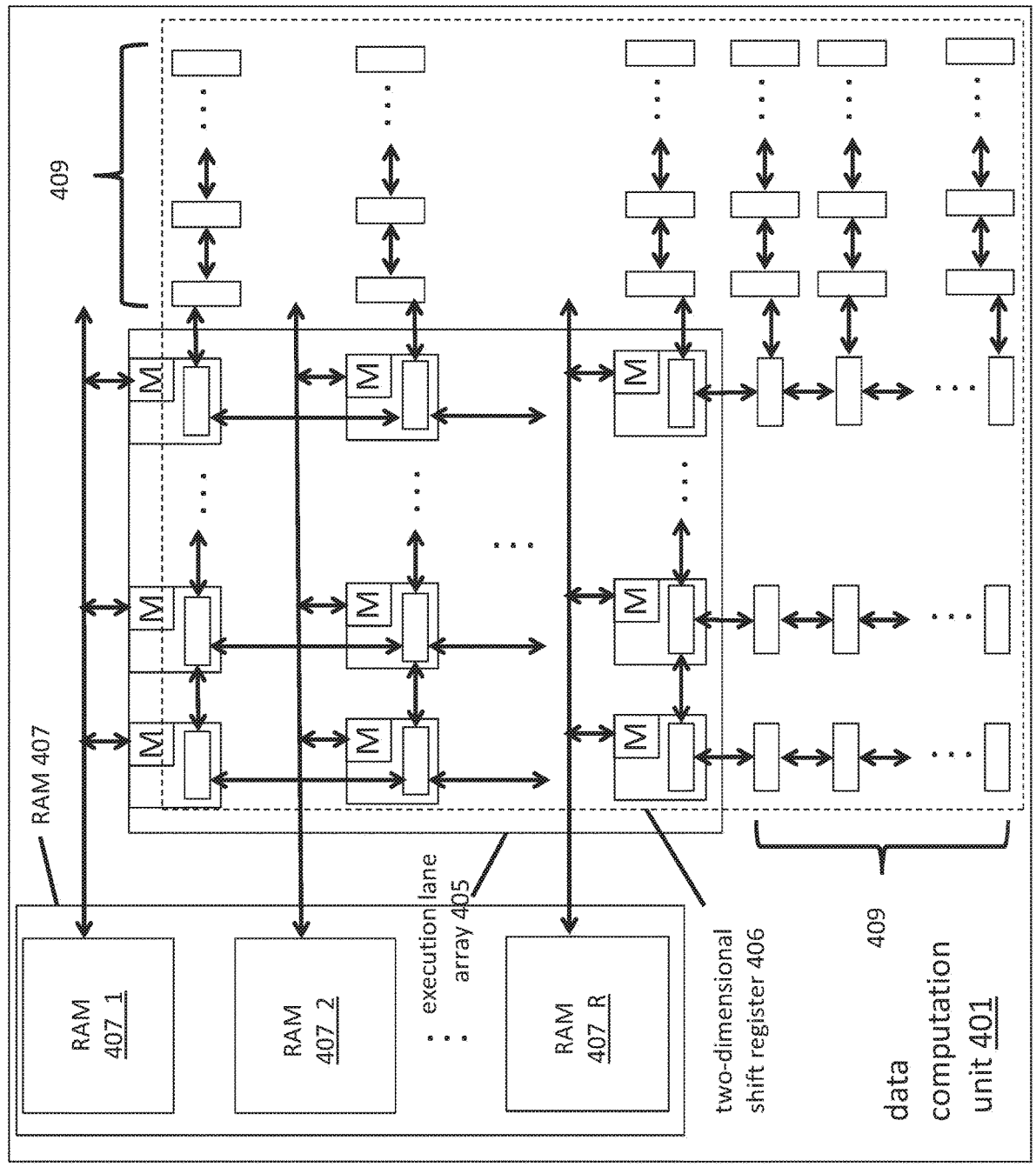
FIG. 4 shows an embodiment of a data computation unit within a stencil processor.

FIG. 4 shows an embodiment of a data computation component 401. As observed in FIG. 4, the data computation component 401 includes an array of execution lanes 405 that are logically positioned "above" a two-dimensional shift register array structure 406. As discussed above, in various embodiments, a sheet of image data provided by a sheet generator is loaded into the two-dimensional shift register 406. The execution lanes then operate on the sheet data from the register structure 406.

The execution lane array 405 and shift register structure 406 are fixed in position relative to one another. However, the data within the shift register array 406 shifts in a strategic and coordinated fashion to cause each execution lane in the execution lane array to process a different stencil within the data. As such, each execution lane determines the output image value for a different pixel in the output sheet being generated. From the architecture of FIG. 4 it should be clear that overlapping stencils are not only arranged vertically but also horizontally as the execution lane array 405 includes vertically adjacent execution lanes as well as horizontally adjacent execution lanes.

Some notable architectural features of the data computation unit 401 include the shift register structure 406 having wider dimensions than the execution lane array 405. That is, there is a "halo" of registers 409 outside the execution lane array 405. Although the halo 409 is shown to exist on two sides of the execution lane array, depending on implementation, the halo may exist on less (one) or more (three or four) sides of the execution lane array 405. The halo 405 serves to provide "spill-over" space for data that spills outside the bounds of the execution lane array 405 as the data is shifting "beneath" the execution lanes 405. As a simple case, a 5×5 stencil centered on the right edge of the execution lane array 405 will need four halo register locations further to the right when the stencil's leftmost pixels are processed. For ease of drawing, FIG. 4 shows the registers of the right side of the halo as only having horizontal shift connections and registers of the bottom side of the halo as only having vertical shift connections when, in a nominal embodiment, registers on either side (right, bottom) would have both horizontal and vertical connections.

Additional spill-over room is provided by random access memories 407 that are coupled to each row and/or each column in the array, or portions thereof (e.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 406 (which some image processing routines may require) the plane of image data is able to further spill-over, e.g., from the halo region 409 into random access memory 407. For example, consider a 6×6 stencil where the hardware includes a halo region of only four storage elements to the right of an execution lane on the right edge of the execution lane array. In this case, the data would need to be shifted further to the right off the right edge of the halo 409 to fully process the stencil. Data that is shifted outside the halo region 409 would then spill-over to random access memory 407. Other applications of the random access memories 407 and the stencil processor of FIG. 3 are provided further below.

FIGS. 5a through 5k demonstrate a working example of the manner in which image data is shifted within the two dimensional shift register array "beneath" the execution lane array as alluded to above. As observed in FIG. 5a, the data contents of the two dimensional shift array are depicted in a first array 507 and the execution lane array is depicted by a frame 505. Also, two neighboring execution lanes 510 within the execution lane array are simplistically depicted. In this simplistic depiction 510, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 5a through 5k depict one of these deeper register locations as being used to store the resultant X from the respective execution lanes. For illustrative ease the deeper resultant register is drawn alongside rather than beneath its counterpart register R2.

FIGS. 5a through 5k focus on the calculation of two stencils whose central position is aligned with the pair of execution lane positions 511 depicted within the execution lane array. For ease of illustration, the pair of execution lanes 510 are drawn as horizontal neighbors when in fact, according to the following example, they are vertical neighbors.

Figure 5A:
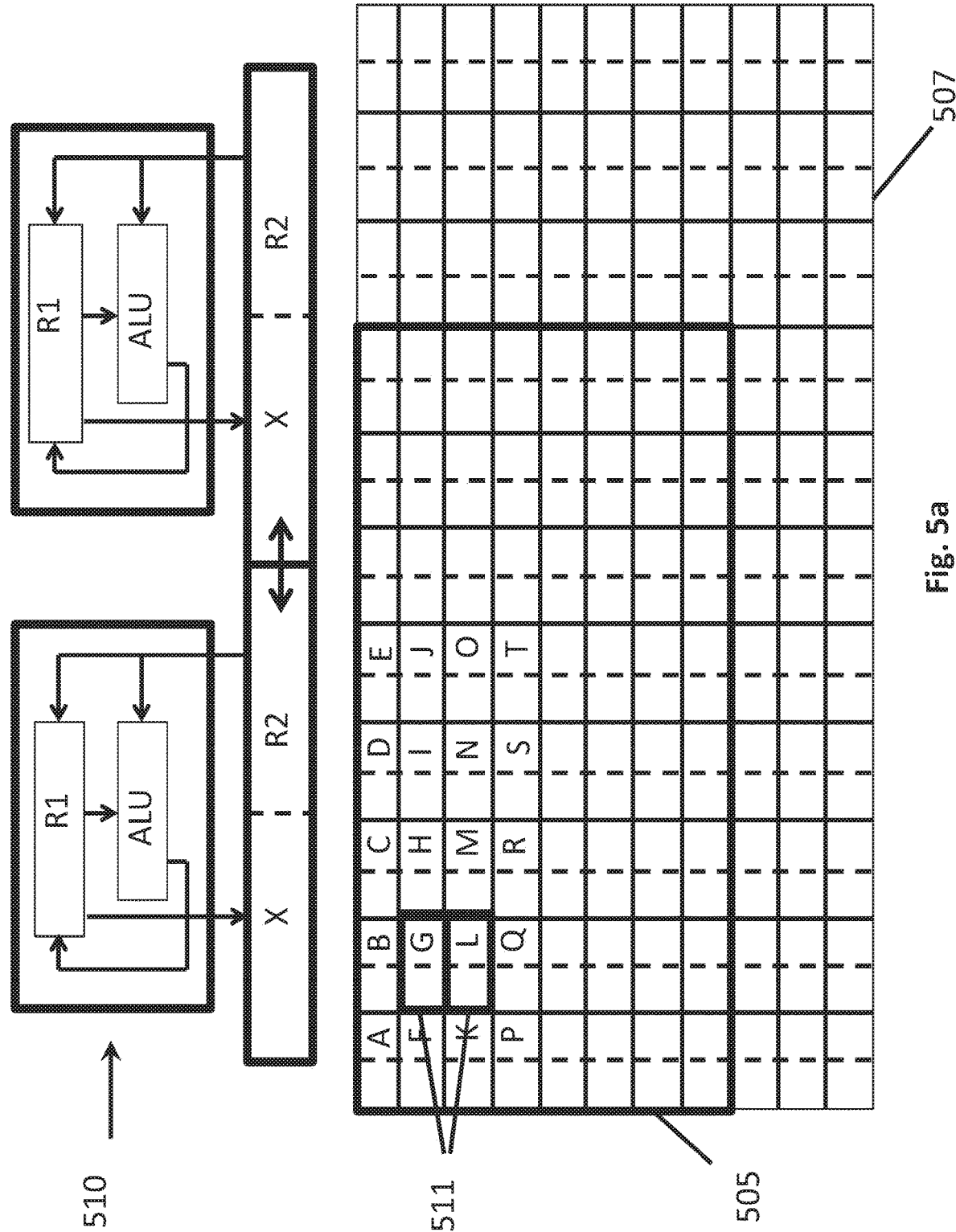
FIGS. 5a, 5b, 5c, 5d, 5e, 5f, 5g, 5h, 5i, 5j and 5k depict an example of the use of a two-dimensional shift array and an execution lane array to determine a pair of neighboring output pixel values with overlapping stencils.
Figure 5B:
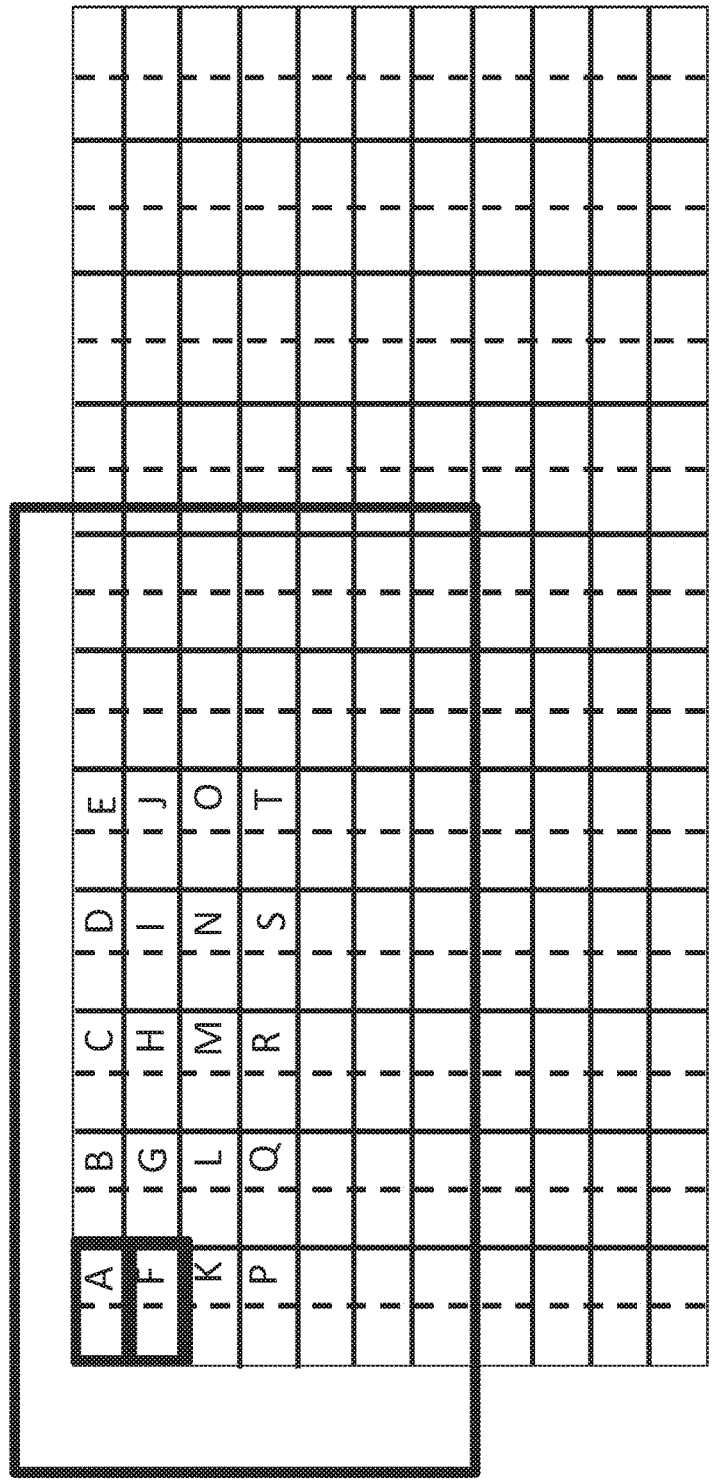

As observed initially in FIG. 5a, the execution lanes are centered on their central stencil locations. FIG. 5b shows the object code executed by both execution lanes. As observed in FIG. 5b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 5C:
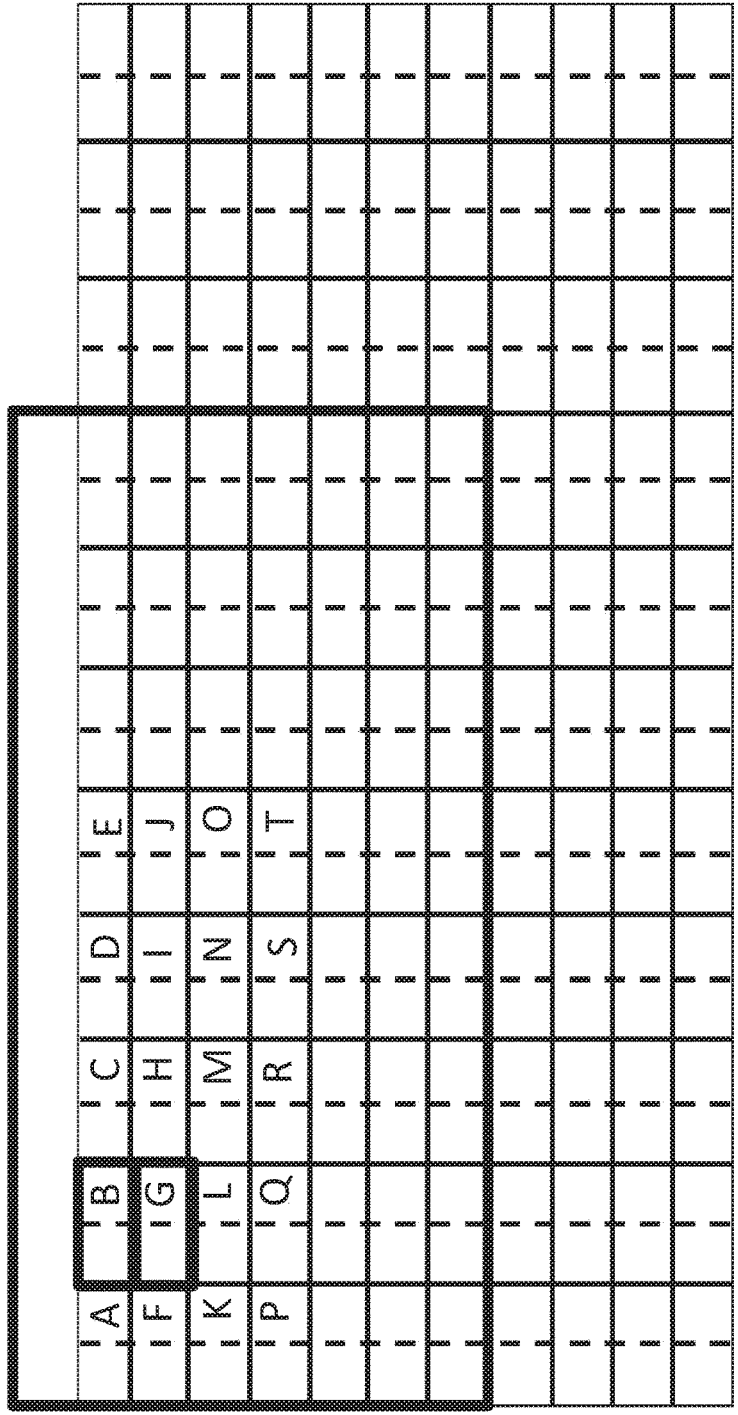
Figure 5D:
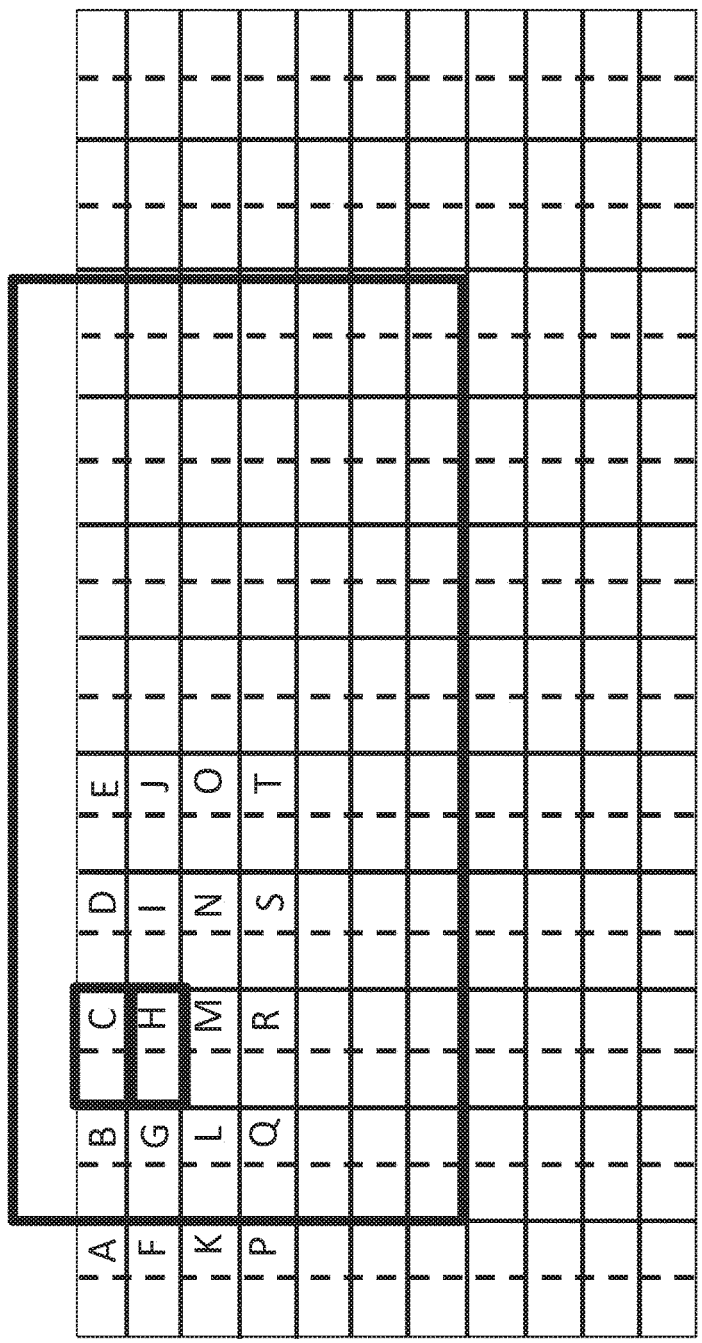

As observed in FIG. 5c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 5d the same process as described above for FIG. 5c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 5E:
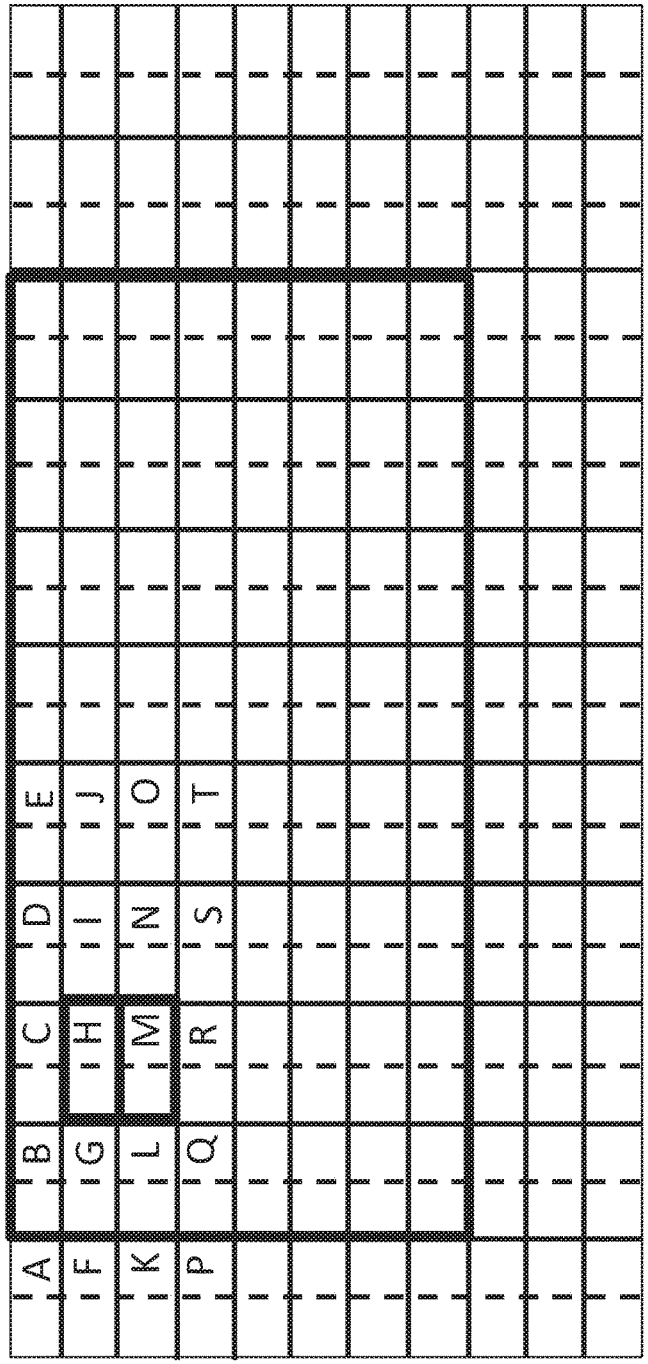
Figure 5F:
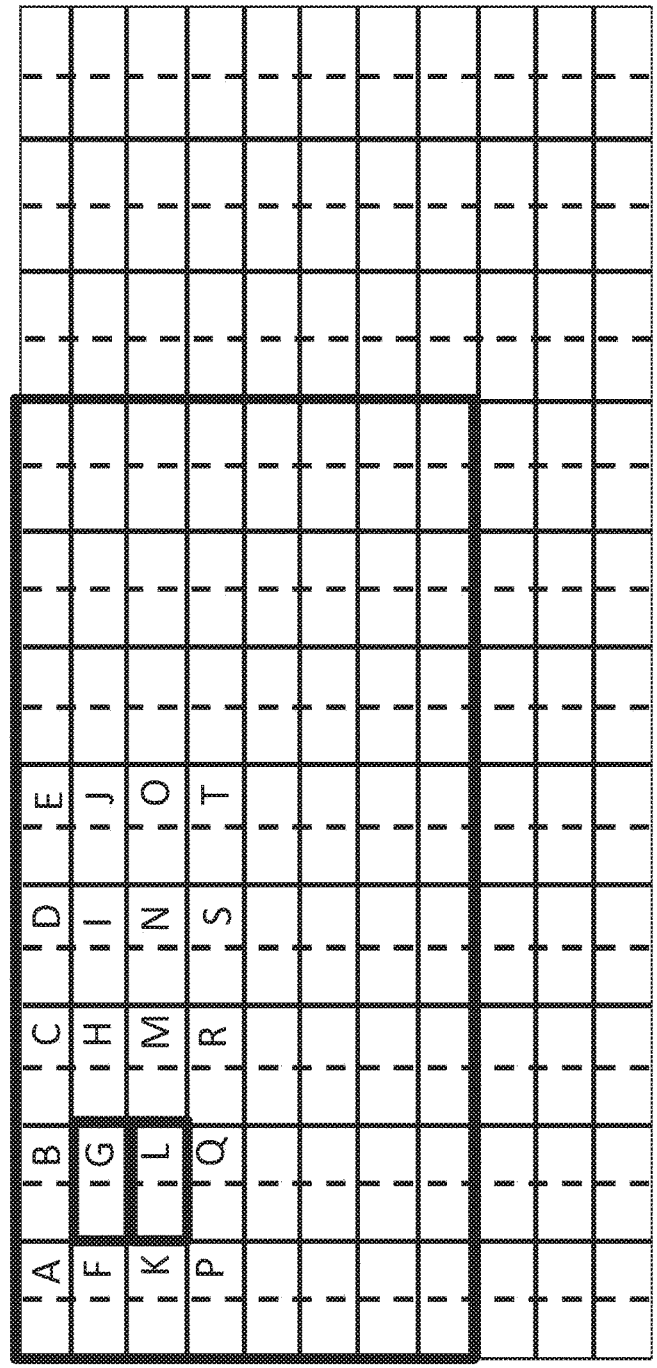
Figure 5G:
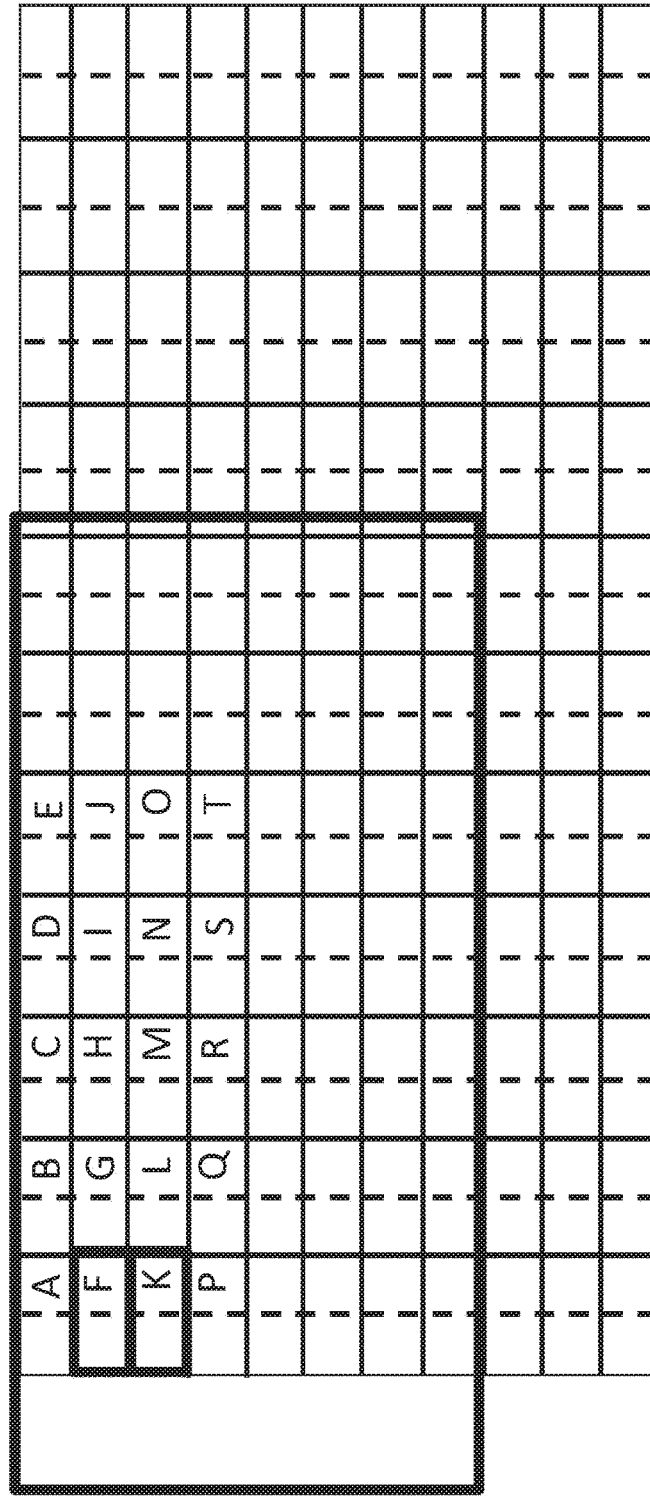

As observed in FIG. 5e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 5f and 5g demonstrate continued progress moving leftwise across the middle row of both execution lane's stencils. The accumulative addition continues such that at the end of processing of FIG. 5g both execution lanes include the summation of the values of the top row and the middle row of their respective stencils.

Figure 5H:
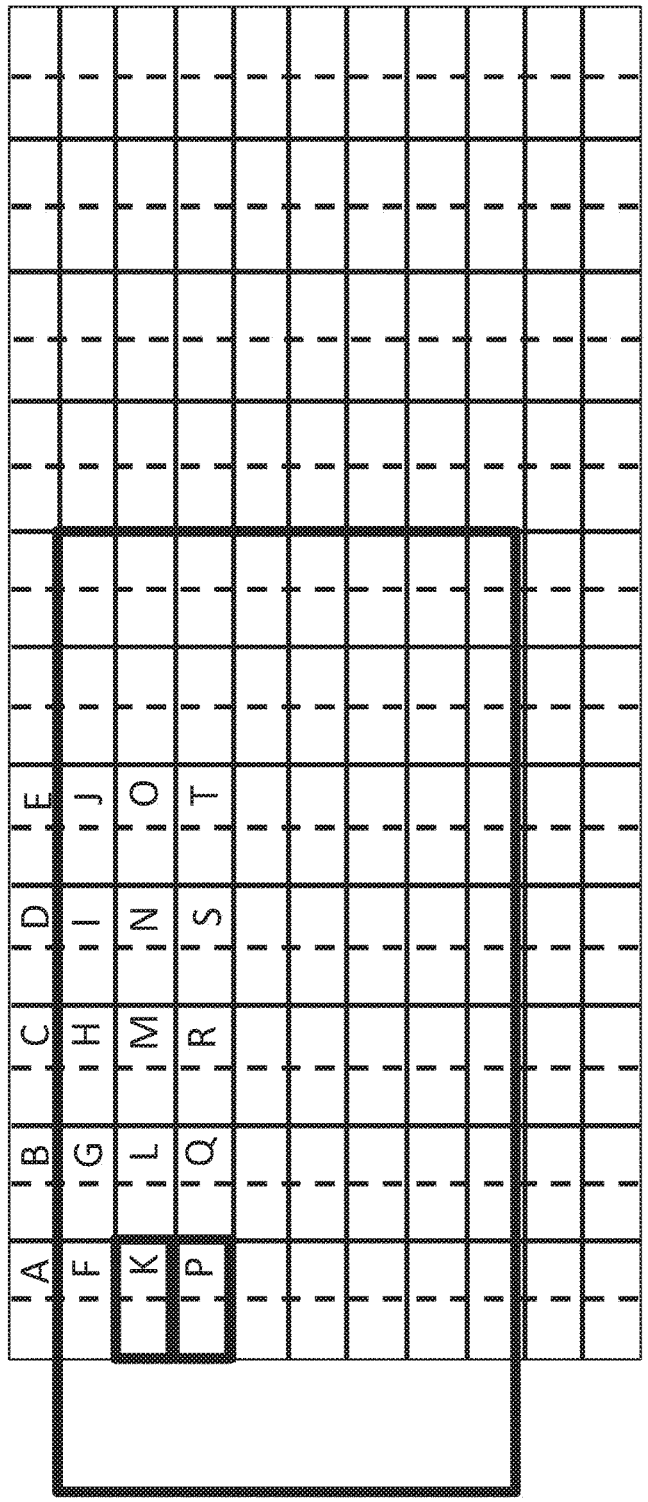
Figure 5I:
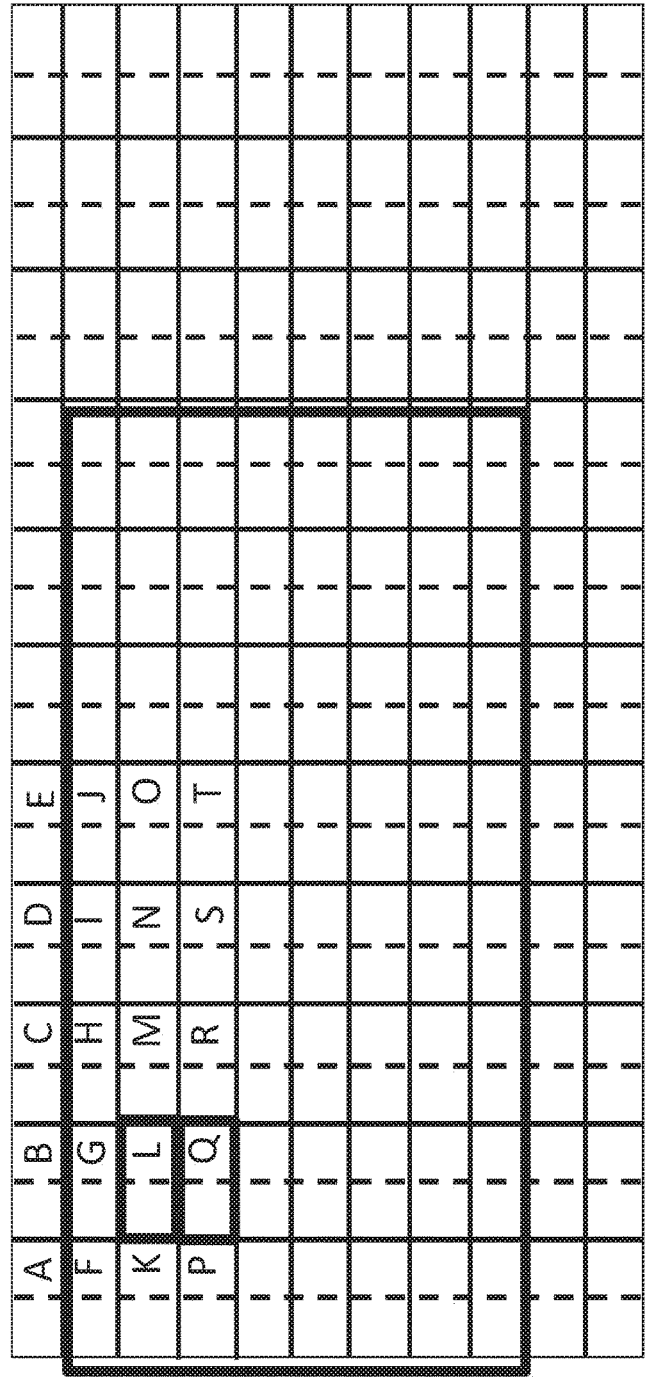
Figure 5J:
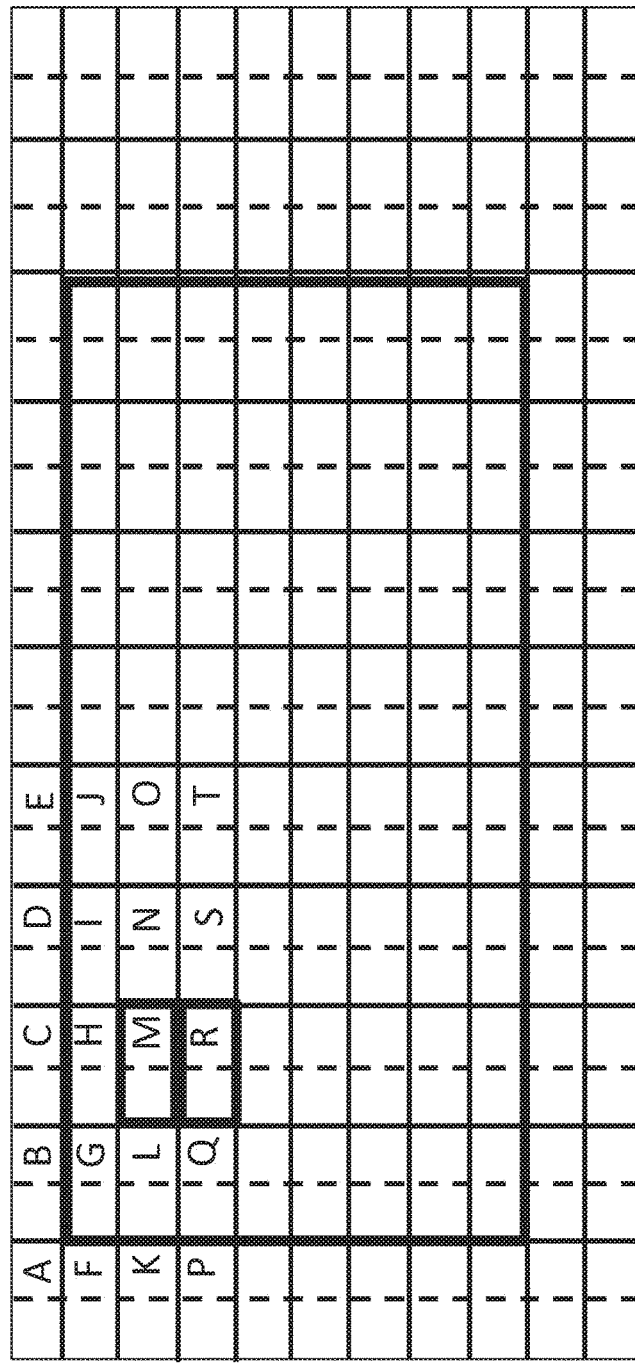
Figure 5K:
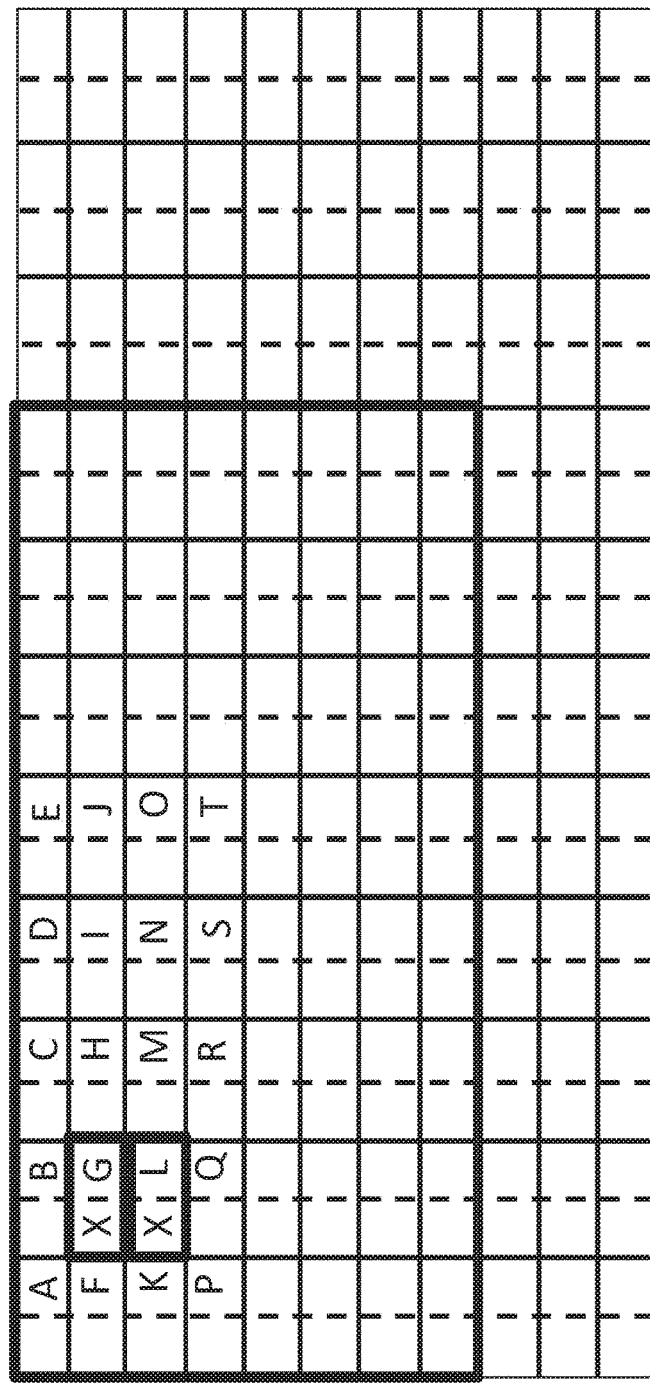

FIG. 5h shows another shift to align each execution lane with its corresponding stencil's lowest row. FIGS. 5i and 5j show continued shifting to complete processing over the course of both execution lanes' stencils. FIG. 5k shows additional shifting to align each execution lane with its correct position in the data array and write the resultant thereto.

In the example of FIGS. 5a-5k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 6:
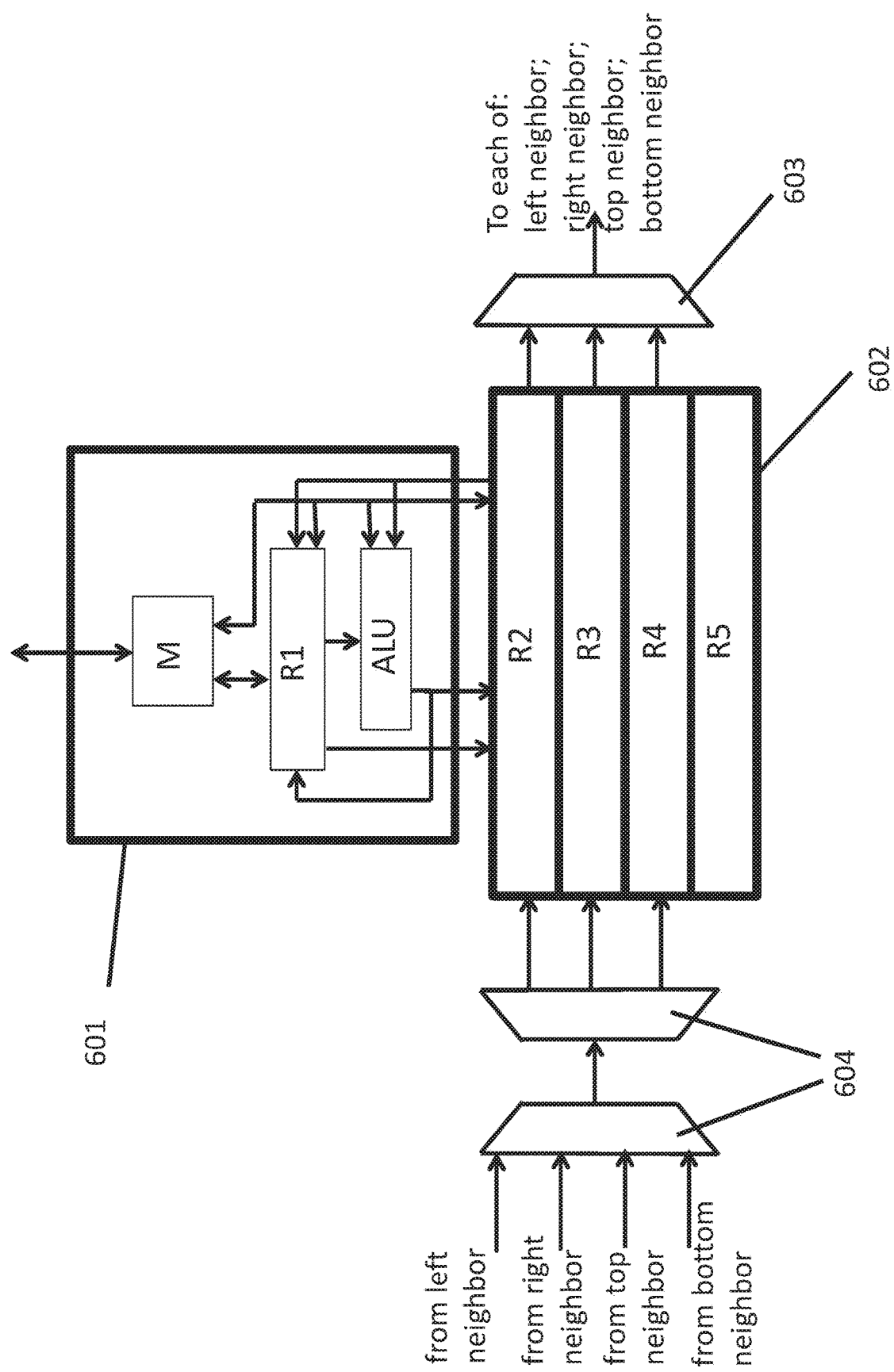
FIG. 6 shows an embodiment of a unit cell for an integrated execution lane array and two-dimensional shift array.

FIG. 6a shows another, more detailed depiction of the unit cell for the array execution lane and shift register structure (registers in the halo region do not include a corresponding execution lane). The execution lane and the register space associated with each location in the execution lane array is, in an embodiment, implemented by instantiating the circuitry observed in FIG. 6a at each node of the execution lane array. As observed in FIG. 6a, the unit cell includes an execution lane 601 coupled to a register file 602 consisting of four registers R2 through R5. During any cycle, the execution lane 601 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 603, and, having the contents of any of (only) one of registers R2 through R4 replaced with content that is shifted "in" from a corresponding one if its neighbors through input multiplexers 604 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 603, 604 permits for different shift source and shift target registers within a same register file during a same cycle.

As depicted in FIG. 6a note that during a shift sequence an execution lane will shift content out from its register file 602 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 603, 604 observed in FIG. 6a is incorporated into the design of FIG. 6a. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 601, in various embodiments, the mathematical opcodes supported by the hardware ALU are integrally tied with (e.g., substantially the same as) the mathematical opcodes supported by a virtual execution lane (e.g., ADD, SUB, MOV, MUL, MAD, ABS, DIV, SHL, SHR, MIN/MAX, SEL, AND, OR, XOR, NOT). As described just above, memory access instructions can be executed by the execution lane 601 to fetch/store data from/to their associated random access memory. Additionally the hardware execution lane 601 supports shift op instructions (right, left, up, down) to shift data within the two dimensional shift register structure. As described above, program control instructions are largely executed by the scalar processor of the stencil processor.

c. Compiler Managed Stencil Processor Memory

Referring back to FIG. 4, recall the existence of a halo region of registers 409 that, in the particular embodiment of FIG. 4, reside around the right and lower edges of the execution lane array 405 (other embodiments may include halo registers on more or less sides of the execution lane array). In the preceding discussions, a "sheet" was understood to be an array of image information that consumed the internal shift register space having the dimensions of the execution lane array 405. Here, in various embodiments, the register locations in the halo 409 do not include associated ALU units for executing image processing instructions on the image data—rather—the halo 409 region exists, e.g., to accumulate "spillover" data from the shifting activity within the execution lane array area. As such, the area of image data that can be processed corresponds to area 405 and a "sheet" is understood to be coextensive with area 405. The loading of a sheet into the register array 406 includes the loading of image data into area 405.

A compiler is responsible for inserting instructions into the program code that essentially control the loading of sheets of information from/to the sheet generator to/from the internal RAM 407 of a stencil processor's data computation unit 401. As such, in various embodiments, the compiler is responsible for determining which sheets are to be loaded into RAM 407 from the sheet generator and when such sheets are to be loaded. Additionally, the compiler is responsible for determining which sheet in stencil processor RAM 407 is to be loaded into the two dimensional shift array 406. Note that RAM 407 may be broken down into separate banks where each bank is assigned a particular region of the image relative to the shift register array (e.g., RAM banks 407_1 hold image data for the first row of the shift register array, RAM banks 407_2 hold image data for the second row of the shift register array, etc.).

Here, the "re-loading" of same sheets of data into RAM 407 from the sheet generator and/or the re-loading of same sheets of data from RAM 407 into the two-dimensional shift register 406 should be avoided where possible so as to, e.g., minimize power consumption of the image processor. As explained in more detail immediately below, inefficiencies can be avoided if the compiler recognizes the presence of the halo region 409 even though the basic unit of image data is understood to be sheets of data that correspond to the smaller area of the execution lane array 405. The avoided inefficiencies are particularly pronounced where the image processing algorithm processes data that extends outside the halo for any output pixels within the execution lane array 405.

FIGS. 7a-7d show a basic example. As observed in FIG. 7a, a sheet of input image data corresponds to region 701 of a larger input image. FIGS. 7a-7d, assume, for simplicity, that the input sheet has the same dimensions as the execution lane array. Although such an arrangement may often be convenient it is not necessary. For example, in cases where the resolution of the input surface is different than the output surface (e.g., from upsampling or downsampling), the sheets can have different dimensions than the execution lane array. For instance, in a processor having an execution lane array of 16×16, 2× downsampled input sheets can be of dimension 32×32 while 2× upsampled input sheets can be of dimension 8×8.

If the input image is understood to include not only sheet 701 but also the surrounding image data that could fit into the halo region, the total amount of input image data would consume shaded region 720. In determining output pixel values for pixels within sheet 701, at least some algorithms may be designed, to processes input image data outside the halo region, such as over larger region 730.

For instance, if the dimensions of the execution lane array 405 is 16 pixel locations by 16 pixel locations and the size of the halo region is an additional 4 pixel locations along the X axis and 4 pixel locations along the Y axis, sheet 701 would have dimension 16 pixel locations by 16 pixel locations and region 720 would have dimension 20 pixel locations by 20 pixel locations. If the algorithm that determines output pixel values for pixels within sheet 701 processes over stencils of dimension 18 pixels by 18 pixels, the surface area that would need to be processed over for sheet 701 would extend outward from region 720 to include the area within boundary 730. Here, for instance, to accommodate processing for the pixel location at the lower right hand corner of sheet 701, a pixel in the lower right corner of the region bounded by boundary 730 would be needed. Thus processing of sheet 701 requires substantial amounts of data from sheets 702, 703 and 704.

In an embodiment, the compiler is designed to comprehend the layout of the multiple sheets within an input image, the dimensions of the execution lane array, the dimensions of the halo and the size of the stencil that is to be processed over for a particular output pixel within the execution lane array area. The compiler then proceeds to insert memory load instructions at opportune locations in the code that load a next sheet of information from the sheet generator into the data computation unit RAM 407.

Additionally, as will be described in more detail further below, the compiler also inserts data movement instructions to move sheets of data within the random access memory 407 of the data computation unit so as to enhance their re-use and thereby reduce duplicate loading of same sheets of data into the random access memory 407 from the sheet generator.

FIG. 7b shows a sequence of instructions 740 constructed by the compiler to cause the sheet generator to initially load the random access memory 407 with a sufficient number of sheets to fully perform the algorithm for each of the pixel locations of the first sheet location 701. As observed in FIG. 7b the data from four sheets 701 through 704 are loaded and assigned logical sheet identifiers (Lsheet_0, Lsheet_1, LSheet_2, LSheet_3). Here, the number of sheets that are loaded corresponds to the number of sheets that the image processing algorithm reaches into if the entire shift register array 406 including the halo region 409 are considered. Recall from the discussion of FIGS. 3a and 3b that in various embodiments the program controller 309 associated with the scalar processor 302 executes instructions that correspond to commands to the sheet generator to load/store sheets of data to/from the data computation unit 301. As such, instructions 740 may be executed by the scalar processor 302.

The compiler also constructs subsequent instructions 750, 760 to load the shift register array 406 with content from the four sheets that were just loaded into RAM (MEM LOAD). Instruction 750 populates the shift register region that is coextensive with the execution lane array 405 with the content of LSheet_0 (content of image region 701). Likewise, consistent with the above discussions, the scalar processor 302 may also execute instructions 750, 760.

Instruction 760 populates the halo region. That is, instruction 760 performs the following: 1) load the left hand side (LHS) of sheet 702 (Lsheet_1) into the region of the halo 409 that resides directly off the right edge of the execution lane array 405; 2) load the upper region (UPR) of sheet 704 (Lsheet_3) into the region of the halo 409 that resides directly beneath the lower edge of the execution lane array 405; 3) load the upper left hand corner of sheet 705 (Lsheet_4) into the region of the halo off the bottom right hand corner of the execution lane array 405. After these loads are performed, the content of the entire shift register array including the halo region (region 720 in FIG. 7a) is loaded with properly positioned input image data.

Here, referring to FIG. 4, note that each execution lane array location contains a memory access unit (M) for executing a memory load instruction (MEM LOAD) to fetch image data from random access memory 407. Although not shown in FIG. 4, in various embodiments each of the locations in the halo region 409 also include a memory access unit so that image data values can be loaded into the halo region 409 from random access memory 407. Again, however, in various embodiments the halo region locations do not contain an ALU unit so that actual image processing remains confined to image data within the execution lane array 405. Thus, instruction 750 correspond to a memory load instruction that is individually executed at each execution lane array location but has different input operand data (which defines the image data to be loaded) based on its location in the array, while, likewise, the MEM LOAD instruction 760 corresponds to a memory load instruction that is individually executed at specific locations within the halo region 409 but has different input operand data (which defines the image data to be loaded) based on its location around the execution lane array. Techniques for specifying the address for these instructions are described in more detail further below.

The compiler also constructs a following set of instructions 770 to perform the image processing algorithm(s) that determine output pixel values for the pixel locations within the LSheet_0 location. Consistent with the above discussions, the calculations include operating over a stencil region for each pixel location that is effected by shifting content within the two-dimensional shift register array. The compiler therefore constructs instructions for performing not only the mathematical calculations over the stencil but also the corresponding register shift instructions.

In the example being presently discussed, recall that the stencil to be processed over for any pixel location within LSheet_0 is of dimension 18×18. As such, there will be "spillover" of image data off the upper and left hand sides of the execution lane array 405 into random access memory 407. That is, shifts of data to the left will cause data from sheet 702 (LSheet_1) and sheet 703 (LSheet_2) within the region bounded by boundary 720 but outside the region bounded by boundary 701 to be loaded into the right edge of the halo region 409. The loading of data into the right edge of the halo region 409 will effectively push "spillover" data out of the shift register from the left edge of the execution lane array and the left edge of the halo region 409 that resides directly beneath the execution lane array 405. The spilled over/pushed out data is written into random access memory 407.

Likewise, shifts of data "up" will cause data from sheet 704 (LSheet_3) and sheet 703 (LSheet_2) within the region bounded by boundary 720 but outside the execution lane area to be loaded into the lower edge of the halo region 409. The loading of data into the lower edge of the halo region 409 will effectively push "spillover" data out of the shift register from the top edge of the execution lane array 409 and the top edge of the halo region that resides to the right of the execution lane array 405. The spilled over/pushed out data is also written into random access memory 407. Again, to effect the shifting, the compiler constructs the code for all loading of new data from RAM 407 into the shift register and the writing of pushed out data from the shift register back into RAM 407.

After all shifting and calculations 770 are performed for sheet 701 (LSheet_0), the process will continue to scan to the right in a raster-like fashion (an output sheet for region 701 may also be written into random access memory 407 for forwarding to the sheet generator). In order to accomplish a raster-like scan of the algorithm, only reassignment of the logical sheets is needed after which the same program code can be re-executed to process output values for the pixels of a next sheet. As such, executing the algorithm in a scan like fashion over the image can be constructed by the compiler as a software loop. Here, internal pointers within the loop program can be updated with each new iteration of the loop. Specifically, when the core routine recognizes that is has reached the far "right" of the data to be loaded for the instant recursion, it likewise recognizes a next recursion is imminent.

Here, as observed in FIG. 7c, the compiler constructs an additional set of instructions 780 that prepare the machine to process the algorithm on the next sheet in the raster scan. The instructions include moving (MOV) the contents of LSheet_1 into LSheet_0 and moving the contents of LSheet_2 into LSheet_3. Additionally, the instructions 780 include instructions to load from the sheet generator into RAM 407 the next Lsheet_1 (sheet 705) and the next LSheet_2 (sheet 706). After these instructions 780 are executed the context of the machine is no different than the context of the machine in FIG. 7b prior to execution of instructions 770 except the location of the sheet to be processed is one sheet to the right (i.e., sheet 702 instead of sheet 701). Importantly, sheets that were already loaded into RAM 407 (i.e., sheets 702 and 703) are not re-loaded into RAM 407 from the sheet generator. As such, any inefficiency that would result if sheets 702 and 703 were re-loaded into RAM 407 is avoided.

Note that the loading of LSheet_1 (sheet 705) and LSheet_2 (sheet 706) into RAM 740 from the sheet generator as indicated by the SG instructions within instructions 780 may be performed, e.g., during operations 770 and subsequently moved within RAM to the Sheet_1 and Sheet_2 locations after the earlier content of these sheets have been moved into Lsheet_0 and LSheet_3, respectively. As such, the SG LOAD instructions of instructions 780 may in fact be implemented as additional MOV instructions within the RAM 407. In an embodiment, the move (MOV) instructions of instructions 780 are actual physical moves of data within the RAM 407. As such, the addresses for LSheet_0 through LSheet_3 as specified within the program code are fixed addresses.

Although the method outlined above with respect to FIGS. 7a through 7c was directed to an example in which the stencil size to be processed over for pixels within sheet 701 was large enough to include pixels that reside outside the halo region, the method is believed to be optimal for applications in which the stencil size to be processed over for pixels within sheet 701 (i.e., within the execution lane array) is small enough such that all pixels to be processed reside within the halo region (i.e., pixels outside boundary 720 and within boundary 730 or beyond are not needed). In this case, the loading of additional image data into the two-dimensional shift register (e.g., along the right edge of the halo region) is avoided.

FIG. 8 depicts a method described above. The method includes repeatedly 801 performing the following. Loading a next sheet of image data from a first location of a memory into a two dimensional shift register array 802. The memory is locally coupled to the two-dimensional shift register array and an execution lane array having a smaller dimension than the two-dimensional shift register array along at least one array axis. The loaded next sheet of image data keeps within an image area of the two-dimensional shift register array. Determining output values for the next sheet of image data through execution of program code instructions along respective lanes of the execution lane array, wherein, a stencil size used in determining the output values encompasses only pixels that reside within the two-dimensional shift register array 803. Moving a next sheet of image data to be fully loaded into the two dimensional shift register array from a second location of the memory to the first location of the memory 804.

Recall from the preceding discussion that during execution of instructions 750, 760 and 770 image data may be loaded from RAM 407 into the two dimensional shift register 406. Here, each individual location in the two dimensional shift register 406 (halo region included) is assumed to include a memory access unit for locally executing a memory load instruction so that data can be individually loaded into its local register space from RAM 407. In an embodiment, the compiler fixes a base address component for LSheet_0 in RAM 407 and the addresses for the additional logical sheets recognized by the compiler to perform the loop (e.g., LSheet_1, LSheet_2 and LSheet_3) have offsets relative to the base address component. For example, if the address in RAM 407 for LSheet_0 is [base], the address for LSheet_1 is [base]+1, the address for LSheet_2 is [base]+2 and the address for LSheet_3 is [base]+3.

In order to support a widely programmable environment, the instruction set architecture of the execution units in the execution lane array and in the halo region support an instruction that generates the correct offset for the particular shift register array location. The offset can then be subsequently used, e.g., to generate the correct address. Here, it is pertinent to point out that the example of FIGS. 7a through 7c was simplistic in the sense that the sheet dimension was identical to the execution lane array dimension. That is, both the sheets and the execution lane array had a dimension of 16 pixel locations×16 pixel locations.

Other embodiments may choose to have, e.g., a sheet size that is larger or smaller than the execution lane array along either or both dimensions. In the case of the former, e.g., LSheet_0 will extend into the halo region, whereas, in the case of the later, e.g., LSheet_1 and/or LSheet_3 will initially load within the dimensions of the execution lane array 405. For simplicity the discussion of FIGS. 9a and 9b, will refer to the simplistic case where the sheet dimensions are the same as the execution lane array's dimensions. However, the generic operation of the instruction, as will be made more clear, can be used for embodiments where the dimensions differ.

FIG. 9a essentially shows a zoom-in of the depiction of FIG. 7a where the full size of the two dimensional shift register array including its halo region is observed as a shaded region. FIG. 9b shows the resultant of a special instruction (QUADRANT) that is executed at each array location. Here, for each shift register array location, the QUADRANT instruction calculates the correct offset to be added to the base memory address when loading content from RAM 407 into the particular shift array location.

In the particular example of FIG. 9b, with sheet dimensions being the same as the execution lane array dimensions, all array locations associated with the execution lane array area will load LSheet_0 having an offset of 0. By contrast, the array locations in the halo region to the immediate right of the execution lane array will load from LSheet_1 having an offset of +1, the array locations in the halo region immediately below the execution lane array will load from LSheet_3 having an offset of +3 and the array locations in the halo region off the corner of the execution lane array will load from LSheet_2 having an offset of +2.

In an embodiment, the instruction accepts as input parameters both the X and Y dimensions of the sheet (Xs, Ys) and the X and Y coordinates that specify the array location's position (Xa, Ya). With these values the QUADRANT instruction can calculate the offset as:

Offset=
0 if (Xa≤Xs) AND (Ya≤Ys)=TRUE
1 if (Xa>Xs) AND (Ya≤Ys)=TRUE 2 if (Xa>Xs) AND (Ya>Ys)=TRUE
3 if (Xa≤Xs) AND (Ya>Ys)=TRUE In various embodiments the compiler generates and array of Xa, Ya coordinate pairs that essentially identify the array location that will read the coordinate pair and specifies Xs and Ys as immediate operands since they are constant across all executions of the QUADRANT instruction. The Xa and Ya coordinate pairs are loaded into the respective array location as input operand information prior to execution of the instruction. In another embodiment, the instruction additionally accepts the [base] address value as an input operand so that the full address value [base]+offset can be provided as the resultant of the QUADRANT instruction. The [base] operand may be specified as an immediate operand or the program code may be constructed to determine the [base] value dynamically and broadcast it to the array locations as an additional input operand.

Note that the QUADRANT instruction is particular to an operating environment where the algorithm that determines output pixel values will operate on pixel values across four sheets. For operating environments, e.g., where the algorithm will operate over nine sheets another instruction HECTANT may be built into the instruction set architecture that calculates which of nine different offsets is to be used for any particular array location.

FIG. 10 shows a depiction of an alternate embodiment of the raster scanning processing approach described above with respect to FIGS. 7a through 7c. In the approach of FIG. 10, if the scan is to the right, the right side of the halo region is not initially loaded. Instead, only the portion of the halo directly beneath the execution lane is loaded. During operation of the algorithm, to the extent new values are needed from LSheet_1 to, e.g., effect a shift to the left, the values are loaded along the right edge of the execution lane array rather than along the right edge of the halo. The approach of FIG. 10 is particularly useful in cases where the algorithm does not operate outside the halo region and will effectively produce code having fewer load instructions.

d. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 11 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 11, the basic computing system may include a central processing unit 1101 (which may include, e.g., a plurality of general purpose processing cores 1115_1 through 1115_N and a main memory controller 1117 disposed on a multi-core processor or applications processor), system memory 1102, a display 1103 (e.g., touchscreen, flat-panel), a local wired point-to-point link (e.g., USB) interface 1104, various network I/O functions 1105 (such as an Ethernet interface and/or cellular modem subsystem), a wireless local area network (e.g., WiFi) interface 1106, a wireless point-to-point link (e.g., Bluetooth) interface 1107 and a Global Positioning System interface 1108, various sensors 1109_1 through 1109_N, one or more cameras 1110, a battery 1114, a power management control unit 1112, a speaker and microphone 1113 and an audio coder/decoder 1114.

An applications processor or multi-core processor 1150 may include one or more general purpose processing cores 1115 within its CPU 1101, one or more graphical processing units 1116, a memory management function 1117 (e.g., a memory controller), an I/O control function 1118 and an image processing unit 1119. The general purpose processing cores 1115 typically execute the operating system and application software of the computing system. The graphics processing units 1116 typically execute graphics intensive functions to, e.g., generate graphics information that is presented on the display 1103. The memory control function 1117 interfaces with the system memory 1102 to write/read data to/from system memory 1102. The power management control unit 1112 generally controls the power consumption of the system 1100.

The image processing unit 1119 may be implemented according to any of the image processing unit embodiments described at length above in the preceding sections. Alternatively or in combination, the IPU 1119 may be coupled to either or both of the GPU 1116 and CPU 1101 as a co-processor thereof. Additionally, in various embodiments, the GPU 1116 may be implemented with any of the image processor features described at length above.

Each of the touchscreen display 1103, the communication interfaces 1104-1107, the GPS interface 1108, the sensors 1109, the camera 1110, and the speaker/microphone codec 1113, 1114 all can be viewed as various forms of I/O (input and/or output) relative to the overall computing system including, where appropriate, an integrated peripheral device as well (e.g., the one or more cameras 1110). Depending on implementation, various ones of these I/O components may be integrated on the applications processor/multi-core processor 1150 or may be located off the die or outside the package of the applications processor/multi-core processor 1150.

In an embodiment one or more cameras 1110 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor comprising:
an execution lane array;
a two-dimensional shift-register array comprising a main region and a halo region outside the main region, wherein each shift register in the main region of the two-dimensional shift-register array is dedicated to a respective execution lane in the execution lane array;
local memory coupled to the two-dimensional shift-register array, wherein the processor is configured to output sheets of image data having a size equal to a size of the main region of the two-dimensional shift-register array; and
wherein the processor is configured to execute multiple instructions of a kernel program on input image data, and wherein the multiple instructions cause the processor to perform operations comprising:
executing one or more first instructions of the multiple instructions to cause the processor to load a first sheet of image data and a second sheet of image data into the local memory,
executing one or more second instructions in the multiple instructions of the kernel program that when executed by the processor cause the processor to load the first sheet of image data from the local memory into the main region of the two-dimensional shift-register array, and
executing one or more third instructions in the multiple instructions of the kernel program that when executed by the processor cause the processor to load a portion of the second sheet of image data into the halo region of the two-dimensional shift-register array that is outside the main region of the two-dimensional shift-register array.

2. The processor of claim 1, wherein:
the halo region of the two-dimensional shift-register array comprises only shift registers that are not dedicated to a respective execution lane in the execution lane array, and
sheet data in the halo region is not processed by the execution lane array.

3. The processor of claim 1, wherein the processor is a component of a system-on-chip comprising multiple general purpose processing cores.

4. The processor of claim 1, wherein:
the execution lane array has a smaller size than the two-dimensional shift-register array along two array axes,
the execution lane array has the same size as the main region of the two-dimensional shift-register array, and
the size of the halo region equals the difference between the size of the two-dimensional shift-register array along two array axes and the main region.

5. The processor of claim 1, wherein the operations further comprise:
executing one or more fourth instructions in the multiple instructions of the kernel program that when executed by the processor cause the processor to update a first pointer to the first sheet of image data in the local memory to reference the second sheet of image data in the local memory when computing output pixel values for locations in the second sheet of image data, thereby bypassing loading of at least a portion of the second sheet of image data when computing the output pixel values for the locations in the second sheet of image data.

6. The processor of claim 1, wherein the operations further comprise:
executing one or more fifth instructions in the multiple instructions of the kernel program that when executed by the processor cause the processor to determine that output pixel values at locations in the second sheet of image data depend on input pixel values in a third sheet of image data, and in response, cause the processor to load the third sheet of image data into the local memory without re-loading the second sheet of image data into local memory.

7. The processor of claim 6, wherein the one or more fifth instructions, when executed by the processor, cause the processor to load a portion of the second sheet and a portion of a third sheet of image data into the halo region of the two-dimensional shift-register array.

8. The processor of claim 1, wherein the processor further comprises one or more sheet generators configured to load sheets of image data into the two-dimensional shift-register array, and the operations further comprising:

executing one or more sixth instructions that when executed by the processor cause the processor to write the computed output pixel values at locations in the first sheet of image data to one or more output sheet generators of a plurality of sheet generators.

9. The processor of claim 1, wherein the processor further comprises one or more sheet generators configured to load sheets of image data into the two-dimensional shift-register array, and wherein executing the one or more first instructions in the multiple instructions to cause the processor to load the first sheet of image data and the second sheet of image data into the local memory comprises loading the first sheet of image data and the second sheet of image data from one or more input sheet generators of a plurality of sheet generators.

10. The processor of claim 1, wherein the multiple instructions cause the processor to compute output pixel values at locations in the first sheet of image data using the first sheet of image data loaded into the main region of the two-dimensional shift-register array and the portion of the second sheet of image data loaded into the halo region of the two-dimensional shift-register array.

11. A computer program product, encoded on one or more non-transitory computer storage media, comprising multiple instructions of a kernel program, that when executed by a processor comprising:

an execution lane array;

a two-dimensional shift-register array comprising a main region and a halo region outside the main region, wherein each shift register in the main region of the two-dimensional shift-register array is dedicated to a respective execution lane in the execution lane array; and local memory coupled to the two-dimensional shift-register array, wherein the processor is configured to output sheets of image data having a size equal to a size of the main region of the two-dimensional shift-register array, cause the processor to perform operations on image data, comprising:

executing one or more first instructions of the multiple instructions to cause the processor to load a first sheet of image data and a second sheet of image data into the local memory, executing one or more second instructions in the multiple instructions of the kernel program that when executed by the processor cause the processor to load the first sheet of image data from the local memory into the main region of the two-dimensional shift-register array, and executing one or more third instructions in the multiple instructions of the kernel program that when executed by the processor cause the processor to load a portion of the second sheet of image data into the halo region of the two-dimensional shift-register array that is outside the main region of the two-dimensional shift-register array.

12. The computer program product of claim 11, wherein:
the halo region of the two-dimensional shift-register array comprises only shift registers that are not dedicated to a respective execution lane in the execution lane array, and
sheet data in the halo region is not processed by the execution lane array.

13. The computer program product of claim 11, wherein the processor is a component of a system-on-chip comprising multiple general purpose processing cores.

14. The computer program product of claim 11, wherein:
the execution lane array has a smaller size than the two-dimensional shift-register array along two array axes,
the execution lane array has the same size as the main region of the two-dimensional shift-register array, and
the size of the halo region equals the difference between the size of the two-dimensional shift-register array along two array axes and the main region.

15. The computer program product of claim 11, wherein the operations further comprise:

executing one or more fourth instructions in the multiple instructions of the kernel program that when executed by the processor cause the processor to update a first pointer to the first sheet of image data in the local memory to reference the second sheet of image data in the local memory when computing output pixel values for locations in the second sheet of image data, thereby bypassing loading of at least a portion of the second sheet of image data when computing the output pixel values for the locations in the second sheet of image data.

16. The computer program product of claim 11, wherein the operations further comprise:

executing one or more fifth instructions in the multiple instructions of the kernel program that when executed by the processor cause the processor to determine that output pixel values at locations in the second sheet of image data depend on input pixel values in a third sheet of image data, and in response, cause the processor to load the third sheet of image data into the local memory without re-loading the second sheet of image data into local memory.

17. The computer program product of claim 16, wherein the one or more fifth instructions, when executed by the processor, cause the processor to load a portion of the second sheet and a portion of a third sheet of image data into the halo region of the two-dimensional shift-register array.

18. The computer program product of claim 11, wherein the processor further comprises one or more sheet generators configured to load sheets of image data into the two-dimensional shift-register array, and the operations further comprising:

executing one or more sixth instructions that when executed by the processor cause the processor to write the computed output pixel values at locations in the first sheet of image data to one or more output sheet generators of a plurality of sheet generators.

19. The computer program product of claim 11, wherein the processor further comprises one or more sheet generators configured to load sheets of image data into the two-dimensional shift-register array, and wherein executing the one or more first instructions in the multiple instructions to cause the processor to load the first sheet of image data and the second sheet of image data into the local memory comprises loading the first sheet of image data and the second sheet of image data from one or more input sheet generators of a plurality of sheet generators.

20. The computer program product of claim 11, wherein the multiple instructions cause the processor to compute output pixel values at locations in the first sheet of image data using the first sheet of image data loaded into the main region of the two-dimensional shift-register array and the portion of the second sheet of image data loaded into the halo region of the two-dimensional shift-register array.

* * * * *